US011256073B2

(12) United States Patent
Zhang

(10) Patent No.: US 11,256,073 B2
(45) Date of Patent: Feb. 22, 2022

(54) ZOOM LENS SYSTEM

(71) Applicant: Aizhong Zhang, Rochester, NY (US)

(72) Inventor: Aizhong Zhang, Rochester, NY (US)

( * ) Notice: Subject to any disclaimer, the term of this patent is extended or adjusted under 35 U.S.C. 154(b) by 391 days.

(21) Appl. No.: 16/442,488

(22) Filed: Jun. 15, 2019

(65) Prior Publication Data

US 2019/0384044 A1 Dec. 19, 2019

Related U.S. Application Data

(60) Provisional application No. 62/686,391, filed on Jun. 18, 2018.

(51) Int. Cl.
| | |
|---|---|
| *G02B 15/20* | (2006.01) |
| *G02B 27/64* | (2006.01) |
| *G01J 3/28* | (2006.01) |
| *G02B 27/14* | (2006.01) |
| *G01J 3/02* | (2006.01) |
| *G02B 13/14* | (2006.01) |

(52) U.S. Cl.
CPC ............ *G02B 15/20* (2013.01); *G01J 3/0208* (2013.01); *G01J 3/28* (2013.01); *G02B 13/14* (2013.01); *G02B 27/141* (2013.01); *G02B 27/646* (2013.01)

(58) Field of Classification Search
CPC ............ G02B 15/144113; G02B 15/20; G02B 27/141; G02B 13/16; G02B 27/646; G01J 3/2823; G01J 3/18; G01J 3/32; G01J 3/36; G06T 2207/10036
See application file for complete search history.

(56) References Cited

U.S. PATENT DOCUMENTS

| | | | |
|---|---|---|---|
| 4,364,642 A | 12/1982 | Tanaka et al. | |
| 4,398,807 A | 8/1983 | Iizuka | |
| 4,859,042 A | 8/1989 | Tanaka | |
| 4,988,858 A | 1/1991 | Pinson | |
| 5,000,549 A | 3/1991 | Yamazaki | |
| 5,121,978 A | 6/1992 | Maruyama | |
| 5,270,857 A | 12/1993 | Oizumi et al. | |
| 5,572,276 A | 11/1996 | Hirakawa | |
| 5,602,394 A * | 2/1997 | Dombrowski | ........ G01J 3/2823 250/334 |
| 6,002,528 A | 12/1999 | Tomita | |

(Continued)

*Primary Examiner* — Kristina M Deherrera
(74) *Attorney, Agent, or Firm* — Lynne M. Blank, Esq.

(57) ABSTRACT

A zoom lens system with a large zoom ratio is disclosed, which operates in a broad spectral range, including visible and infrared spectra. The zoom lens system comprises, in order from the object side to the image side, a positive first lens group, a negative second lens group, a positive third lens group, a positive fourth lens group, and a detection system, wherein zooming from a wide-angle end to a telephoto end is performed by axially moving the second and third lens groups. The system has a relatively long back focal length, and satisfies the following conditions: $0.2<|f2|/(f_W*f_T)^{1/2}<2$, $1<f4/|f2|<8$, $0.3<|f2|/f3<1.5$, where $f_W$ is the system focal length at the wide-angle end, $f_T$ is the system focal length at the telephoto end, $(f_W*f_T)^{1/2}$ is the geometric mean of the two focal lengths, and fi is the focal length of the i-th lens group.

18 Claims, 28 Drawing Sheets

(56) References Cited

U.S. PATENT DOCUMENTS

| | | |
|---|---|---|
| 6,433,938 B1 | 8/2002 | Kawamura |
| 6,545,819 B1 | 4/2003 | Nanba et al. |
| 6,710,932 B2 | 3/2004 | Kitaoka et al. |
| 6,741,399 B2 | 5/2004 | Ori |
| 6,825,994 B2 | 11/2004 | Harada |
| 7,289,274 B1 | 8/2007 | Saori |
| 7,312,934 B2 | 12/2007 | Iwasawa |
| 7,554,746 B2 | 6/2009 | Ohashi |
| 7,706,080 B2 | 4/2010 | Ohtake et al. |
| 8,228,617 B2 | 7/2012 | Fujisaki |
| 8,305,687 B2 | 11/2012 | Ryu |
| 8,654,447 B2 | 2/2014 | Morooka |
| 9,880,375 B2 | 1/2018 | Nakano |
| 2015/0070780 A1* | 3/2015 | Sudoh ............ G02B 15/144113 359/687 |
| 2017/0363472 A1* | 12/2017 | Abdulhalim .......... G01J 3/2823 |
| 2019/0025121 A1* | 1/2019 | Munch .................. G01J 3/14 |

\* cited by examiner

ZOOM LENS SYSTEM

CROSS REFERENCE TO RELATED APPLICATIONS

Priority is claimed to Provisional U.S. Patent Application Ser. No. 62/686,391 by A. Zhang filed on Jun. 18, 2018 and entitled "Zoom lens system", the disclosure of which is incorporated herein by reference.

FIELD OF THE INVENTION

This invention relates to a zoom lens system, more particularly, to a multispectral or hyperspectral zoom lens system with a large zoom ratio that operates in both visible and infrared spectra.

BACKGROUND OF THE INVENTION

Zoom lenses with a large zoom ratio of over 5× have become increasingly popular. Many zoom lens designs with three or four lens units, where two or more lens units are moving during the zooming process, have been described in the prior art, such as U.S. Pat. Nos. 4,364,642, 4,859,042, 5,121,978, 6,002,528, 6,545,819, etc. Specifically, PNPP zoom lens designs, i.e. designs with a positive lens group, a negative lens group, a positive lens group and a positive lens group in order from the object side, have been disclosed in U.S. Pat. Nos. 4,398,807, 5,572,276, 6,433,938, 6,710,932, 6,741,399, 7,289,274, 7,554,746, 7,706,080, 8,228,617, 8,305,687, etc. Some focusing lenses also use the PNPP configuration, such as U.S. Pat. No. 6,825,994, etc. Further, some zoom lens systems in the prior art include a group or a subgroup of lenses to move in a plane transverse to the optical axis for image stabilization, to reduce vibration caused by hand shaking or the jerky motion of a camera platform, as disclosed in U.S. Pat. Nos. 5,000,549, 5,121, 978, 5,270,857, 7,312,934, 8,228,617, 8,305,687, 8,654,447, etc.

However, most of these zoom lens systems are designed for visible spectrum only, mainly due to the high demand in various types of photographic and video cameras. For some other applications, it's advantageous or even necessary to use multispectral or hyperspectral systems to image not only in the visible spectrum, but also in the near-infrared, or even short-wave infrared spectrum.

Multispectral and hyperspectral imaging integrates imaging and spectrometry. The rich spectral information provided by multispectral and hyperspectral imaging can be crucial in applications such as vegetation growth monitoring, forest canopy differentiation, gas pipeline leakage inspection, night-time surveillance, mineralogy exploration, meteorology analysis, etc.

Multispectral imaging records images in a number of spectral bands. Usually spectral filters and different detectors that are sensitive to particular wavelength ranges are employed. The total number of spectral bands is usually fewer than twenty.

Hyperspectral imaging has much more spectral channels than multispectral imaging and usually hundreds of spectral channels are used. Each hyperspectral image data set is a three-dimensional data cube, known as a "hypercube", with two spatial dimensions (x, y), and one spectral dimension λ.

There is no consensus on the number of spectral bands to clearly distinguish hyperspectral imaging from multispectral imaging. However, hyperspectral imaging generally captures a continual spectrum, with more spectral bands and higher spectral resolution, compared to multispectral imaging.

However, there is still a significant gap between zoom lens systems and multispectral or hyperspectral systems. Because of the ray path variations at different zoom positions, monochromatic and chromatic aberrations at different zoom positions are different, and it becomes difficult to obtain good optical performance throughout the entire zoom range. The zoom lens design becomes even more complicated if a large spectrum coverage is required. For a broad spectrum from visible to short-wave infrared, usually it's necessary to use glasses with extraordinary relative partial dispersion ratios in a refractive system design.

Furthermore, the detectors that are responsive to visible light, near-infrared light, and short-wave infrared (SWIR) light are usually made of different materials, and usually have different pixel sizes. For example, common visible-near infrared (VNIR) sensors are silicon-based, such as charge-coupled devices (CCD), or complementary metal-oxide-semiconductors (CMOS), while common SWIR sensors are based on indium gallium arsenide (InGaAs), and InGaAs sensors tend to have bigger pixel size than visible or visible-near infrared sensors. Therefore, it's often preferred to split light into different detection channels by spectral filters, prisms, dichroic mirrors, or diffractive optical elements, etc. The insertion of these spectral splitting components usually requires a long back focal length of the imaging system, which presents additional challenge in aberration balance during zoom.

Some multispectral zoom lens designs have been disclosed, for example, U.S. Pat. No. 4,988,858 describes a multispectral catoptric zoom system.

Some zoom lens designs covering visible, near-infrared and short-wave infrared spectra have been disclosed, for example, U.S. Pat. No. 9,880,375. However, in this design, only two lens units are employed and the aperture stop is set in between these two lens units. Further, several aspherical surfaces have to be employed for optical aberration correction, which usually makes the manufacturing process longer and more expensive, and the element and assembly tolerancing requirements stricter.

SUMMARY OF THE INVENTION

It is an object of this invention to provide a zoom lens system that operates beyond the limit of visible spectrum to cover a broad wavelength range from visible to near infrared, even to short-wave infrared.

It is another object of this invention to provide a zoom lens system with a large zoom ratio that can operate in a wide angle mode when zoomed out to see a large scale of a scene, and in a telephoto mode when zoomed in to examine a limited field of view with details. Preferably, the zoom ratio is no less than 5×.

It is another object of this invention to provide a zoom lens system with a long back focal length, so that an optional spectral splitting unit, such as spectral filters or a scanning mirror system could be inserted in the detection system to split the collected light into a plurality of spectral channels.

It is yet another object of this invention to provide some embodiments of the lens design with all spherical optical surfaces, which in general are more economically affordable and less time-consuming to manufacture, and more suitable for volume production, compared with other designs in the prior art that employ aspherical glass surfaces. Further, spherical surfaces usually have relaxed tolerances in element manufacturing and system assembly errors, such as decenter and tilt.

It is still another object of this invention to provide a multispectral or a hyperspectral zoom lens system to combine zoom lens imaging with spectroscopy.

The present invention relates to a zoom lens system comprising, in order from an object side to an image side: a first lens group having positive power; a second lens group having negative power; a third lens group having positive power; a fourth lens group having positive power; and a detection system. The four lens groups and the detection system operate in a broad spectral range, covering visible and infrared spectra, and each of the four lens groups comprises at least one lens element. Zooming from a wide-angle end position to a telephoto end position is performed by moving the second and third lens groups along the optical axis, such that the distance between the first and second lens groups increases and the distance between the second and third lens groups decreases. The zoom lens system satisfies the following conditions: $0.2 < |f2|/(f_W \cdot f_T)^{1/2} < 2$, $1 < f4/|f2| < 8$, $0.3 < |f2|/f3 < 1.5$, where $f_W$ is a system focal length at the wide-angle end position, $f_T$ is a system focal length at the telephoto end position, $(f_W \cdot f_T)^{1/2}$ is a geometric mean of the system focal lengths at the wide-angle end position and the telephoto end position, and fi is a focal length of the i-th lens group.

BRIEF DESCRIPTION OF THE DRAWINGS

FIG. 2 presents Embodiment 1 of the zoom lens system at seven representative zoom positions (Z1-Z7), from the wide-angle end above to the telephoto end below.

FIG. 3 presents the detailed lens shapes of each lens group of Embodiment 1.

FIG. 4 (a)-(c) present astigmatic field curves and distortion of Embodiment 1 at three representative zoom positions (Z1, Z4, Z7).

FIG. 5 presents the transverse ray aberration plots of Embodiment 1 with five representative wavelengths at three zoom positions (Z1, Z4, Z7).

FIG. 6 presents Embodiment 2 of the zoom lens system at seven representative zoom positions (Z1-Z7), from the wide-angle end above to the telephoto end below.

FIG. 7 presents the detailed lens shapes of each lens group of Embodiment 2.

FIG. 8 (a)-(c) present astigmatic field curves and distortion of Embodiment 2 at three representative zoom positions (Z1, Z4, Z7).

FIG. 9 presents the transverse ray aberration plots of Embodiment 2 with five representative wavelengths at three zoom positions (Z1, Z4, Z7).

FIG. 10 presents Embodiment 3 of the zoom lens system at seven representative zoom positions (Z1-Z7), from the wide-angle end above to the telephoto end below.

FIG. 11 presents the detailed lens shapes of each lens group of Embodiment 3.

FIG. 12 (a)-(c) present astigmatic field curves and distortion of Embodiment 3 at three representative zoom positions (Z1, Z4, Z7).

FIG. 13 presents the transverse ray aberration plots of Embodiment 3 with five representative wavelengths at three zoom positions (Z1, Z4, Z7).

FIG. 14 presents Embodiment 4 of the zoom lens system at seven representative zoom positions (Z1-Z7), from the wide-angle end above to the telephoto end below.

FIG. 15 presents the detailed lens shapes of each lens group of Embodiment 4.

FIG. 16 (a)-(c) present astigmatic field curves and distortion of Embodiment 4 at three representative zoom positions (Z1, Z4, Z7).

FIG. 17 presents the transverse ray aberration plots of Embodiment 4 with five representative wavelengths at three zoom positions (Z1, Z4, Z7).

FIG. 18 presents Embodiment 5 of the zoom lens system at seven representative zoom positions (Z1-Z7), from the wide-angle end above to the telephoto end below.

FIG. 19 presents the detailed lens shapes of each lens group of Embodiment 5.

FIG. 20 (a)-(c) present astigmatic field curves and distortion of Embodiment 5 at three representative zoom positions (Z1, Z4, Z7).

FIG. 21 presents the transverse ray aberration plots of Embodiment 5 with five representative wavelengths at three zoom positions (Z1, Z4, Z7).

FIG. 22 presents Embodiment 6 of the zoom lens system at seven representative zoom positions (Z1-Z7), from the wide-angle end above to the telephoto end below.

FIG. 23 presents the detailed lens shapes of each lens group of Embodiment 6.

FIG. 24 (a)-(c) present astigmatic field curves and distortion of Embodiment 6 at three representative zoom positions (Z1, Z4, Z7).

FIG. 25 presents the transverse ray aberration plots of Embodiment 6 with five representative wavelengths at three zoom positions (Z1, Z4, Z7).

DETAILED DESCRIPTION OF THE INVENTION

Figure 1:
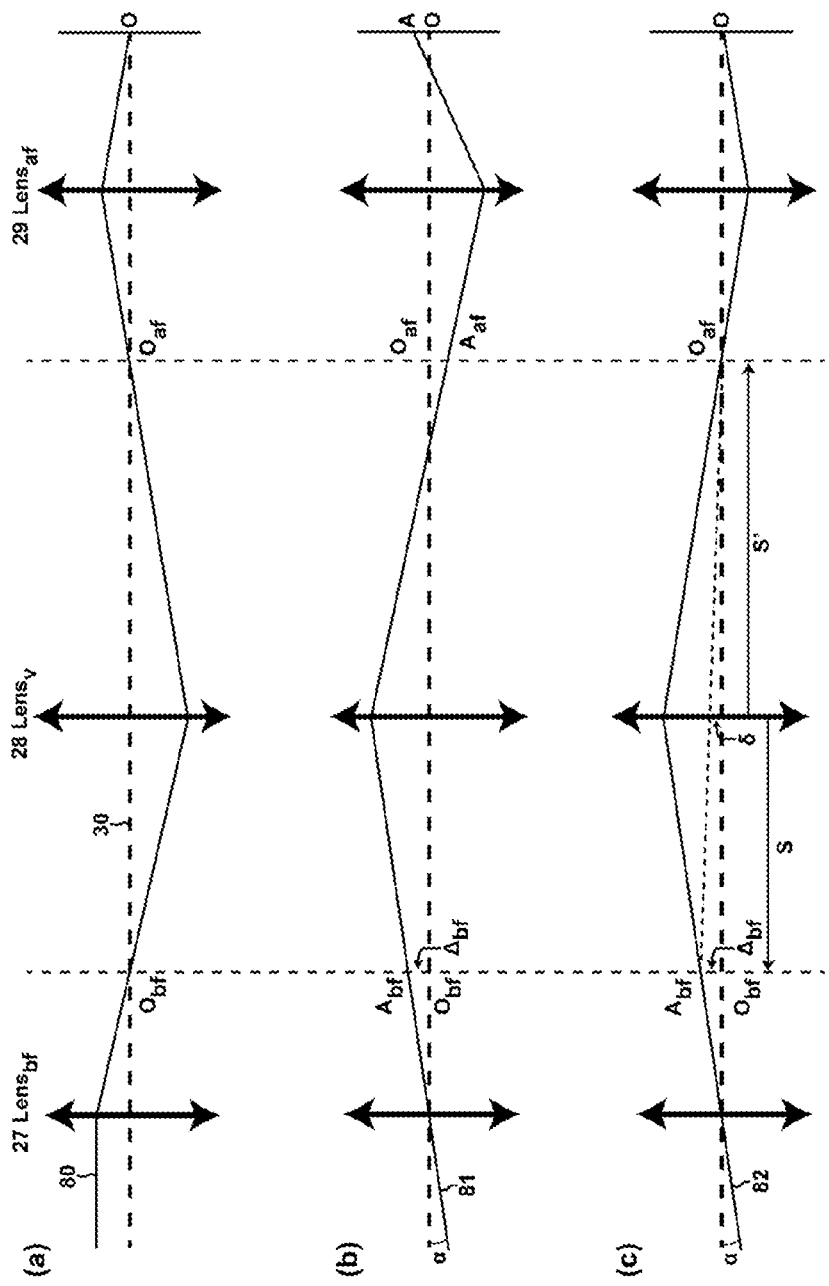
FIG. 1 presents a first order analysis of image stabilization.

In this invention, systems with six different embodiments of zoom lens groups are disclosed. All of these embodiments are 10× zoom lens systems, and they all operate in a broad spectral range, with three embodiments covering visible to near infrared, and three other embodiments covering an even broader spectral range of visible to short-wave infrared. They are all optimized for an image sensor with a half diagonal length of 3.084 mm, and a full diagonal length of 6.168 mm. However, larger sensors might also be used to match the listed embodiments, if the optical performance degradation at larger field of view beyond the currently optimized region is still acceptable for an intended application. Further, the detailed parameters in the listed embodiments could be scaled and adjusted to match sensors of other sizes.

The zoom lens system in each embodiment comprises, in order from the object side to the image side, a first lens group G1 having positive power, a second lens group G2 having negative power, a third lens group G3 having positive power, a fourth lens group G4 having positive power, and a detection system.

Zooming from the wide-angle end position to the telephoto end position is accomplished by moving the second lens group G2 and the third lens group G3 along the optical axis, such that the distance between G1 and G2 increases and the distance between G2 and G3 decreases.

The zoom lens system satisfies the following conditions:

$$0.2 < |f2|/(f_W \cdot f_T)^{1/2} < 2, \quad (1)$$

$$1 < f4/|f2| < 8, \quad (2)$$

$$0.3 < |f2|/f3 < 1.5, \quad (3)$$

where $f_W$ is the system focal length at the wide-angle end position, $f_T$ is the system focal length at the telephoto end position, $(f_W \cdot f_T)^{1/2}$ is the geometric mean of the system focal lengths at the wide-angle end position and the telephoto end position, and fi is the focal length of the i-th lens group.

The zoom lens system has a relatively long back focal length so that a spectral splitting unit could be inserted to split light into different detection channels. In all of the listed embodiments, the back focal length is no less than 35 mm.

In the preferred embodiments, the aperture stop is placed between G2 and G3. For a specific field point, the ray bundle within the upper rim ray and the lower rim ray covers a much larger portion of the lens surfaces of G1 and G2 in the telephoto end compared with the wide-angle end. Generally speaking, the marginal ray height and the marginal ray incident angle on each surface in G1 and G2 tend to be larger for the telephoto end. Therefore, for G1 and G2, certain optical aberrations, including spherical aberration and axial color are larger in the telephoto end than in the wide-angle end. On the other hand, the ray bundle coverage variations through zoom on surfaces of G3 and G4 are much smaller, hence the aberration variations through zoom of G3 and G4 are also smaller, even though the aberrations themselves are not necessarily smaller.

Generally, due to the correlation of aberration variation during zoom, in order to minimize the total optical aberration sum, aberrations induced by G1 and G2 should be able to balance each other to a certain degree, and aberrations induced by G3 and G4 should be able to balance each other to a certain degree. This pair-wise aberration balance is especially important for designs with all spherical surfaces. By having G1 positive and G2 negative, the opposite optical aberrations, including spherical aberration and axial color could cancel out to a certain extent and result in a much lower residue aberration for G3 and G4 to further correct.

By satisfying conditions (1)-(3), it's possible to provide a zoom lens system with a large zoom ratio in a broad spectrum and maintain a relatively long back focal length.

Condition (1) relates to the ratio of the magnitude of the focal length of the second lens group G2 with respect to the geometric mean of system focal lengths at the wide-angle end and the telephoto end. When the optical power of G2 becomes strong with the ratio beyond the lower limit, it helps to minimize the overall system length, but the Petzval sum and the field curvature increases. When the optical power of G2 becomes weak with the ratio exceeding the upper limit, the required axial displacement of G2 increases, which will lead to a long overall system length.

Condition (2) relates to the ratio of the focal length of the fourth lens group G4 with respect to the magnitude of the focal length of the second lens group G2. When the ratio exceeds the lower limit, either the optical power of G4 becomes too strong, or the optical power of G2 becomes too weak. A strong G4 tends to shorten the back focal length such that inserting a spectral splitting unit might no longer be possible. While a weak G2 tends to lengthen the overall system length. In contrast, if the ratio goes beyond the upper limit, either the optical power of G4 might be too weak, or the optical power of G2 becomes too strong. A weak G4 might lead to a very long overall system length, and the Petzval sum and the field curvature tend to increase due to a relatively stronger G2.

Condition (3) relates to the ratio of the focal lengths of the two moving groups through zoom, G2 and G3. Throughout the zoom motion, one group is the variator to change the system focal length and field of view, and the other group is the compensator to maintain a stable image plane. If the ratio falls below the lower limit, either the optical power of G2 becomes strong or the optical power of G3 becomes too weak. A strong G2 makes it difficult to correct the Petzval sum and the field curvature. A weak G3 tends to lengthen the overall system length. If the ratio exceeds the upper limit, either G3 becomes too strong, or G2 becomes too weak. A strong G3 makes it difficult to balance G3 with G4, and correct the overall system aberrations. A weak G2 tends to lengthen the overall system length. Note that in either of the cases beyond the upper or lower limits, the overall system length tends to increase, since the weaker group will have to move a longer distance to balance the other moving group to maintain a stable image plane.

In order to obtain sharp images for a broad range of wavelengths beyond the limit of the visible spectrum, careful correction of axial and lateral chromatic aberrations is necessary. Usually, this demands the use of lens materials, for example, glasses, with relative partial dispersion ratios deviating from the so-called "normal line", which is a linear line of the relative partial dispersion ratio with respect to the Abbe number, originally defined with SCHOTT K7 and F2 glasses.

In order to quantify the relative partial dispersion ratios in a large spectral range beyond the visible spectrum, the refractive indices of a lens material at three wavelengths are used to represent short, medium and long wavelengths. In this invention, two types of spectrum are used for different embodiments. The first type spectral band is from 400 nm to 900 nm, i.e. from visible to near infrared, and the first relative partial dispersion ratio $P_1 = (n_{s1} - n_{m1})/(n_{s1} - n_{l1})$, where $n_{s1}$, $n_{m1}$, and $n_{l1}$ are the refractive indices at three representative wavelengths: 400 nm, 650 nm, and 900 nm, respectively. Preferably, the first relative partial dispersion ratio $P_1$ satisfies the following condition (4):

$$-0.010 < P_1(G2p)_{AVE} - P_1(G2n)_{AVE} < 0.045, \quad (4)$$

where $P_1(G2p)_{AVE}$ is the average value of the first relative partial dispersion ratios of lens materials of all the positive lens elements in the second lens group G2, and $P_1(G2n)_{AVE}$ is the average value of the first relative partial dispersion ratios of lens materials of all the negative lens elements in the second lens group G2.

The second type is a broadband spectrum covering from 400 nm to 1700 nm, i.e. from visible to short-wave infrared, and the three representative wavelengths are 400 nm, 1050 nm, and 1700 nm. The second relative partial dispersion ratio $P_2=(n_{s2}-n_{m2})/(n_{s2}-n_{l2})$, where $n_{s2}$, $n_{m2}$, and $n_{l2}$ are the refractive indices of a lens material at 400 nm, 1050 nm, and 1700 nm, respectively. Preferably, the second relative partial dispersion ratio $P_2$ satisfies the following condition (5):

$$-0.010<P_2(G2p)_{AVE}-P_2(G2n)_{AVE}<0.035, \qquad (5)$$

where $P_2(G2p)_{AVE}$ is the average value of the second relative partial dispersion ratios of lens materials of all the positive lens elements in the second lens group G2, and $P_2(G2n)_{AVE}$ is the average value of the second relative partial dispersion ratios of lens materials of all the negative lens elements in the second lens group G2.

The second lens group G2 is the only negative group in the disclosed zoom lens system, and it plays an indispensable role in chromatic aberration control. Generally speaking, for a lens system corrected for the primary color, it's desirable to have similar relative partial dispersion ratios of the positive and negative elements in order to correct for the secondary color. The small discrepancy between the average relative partial dispersion ratios of all the positive elements and all the negative elements of G2 helps to minimize chromatic aberration and enable a larger spectral coverage of the system.

All of the listed embodiments are optimized for an object at infinity. However, the fourth lens group G4 or the last lens element of the fourth lens group G4 closest to the detection system could be axially displaceable, so that a displacement could be adjusted to focus on objects closer to the zoom lens system, rather than at infinity. In some embodiments, focusing on objects close to the zoom lens system could also be achieved by axially displacing other lens elements in the zoom lens system, such as the first lens group, or a subgroup in the first lens group.

The disclosed zoom lens system could be operated by a user, or it could be mounted on a moving platform, such as a car or an unmanned aerial vehicle (UAV), etc. In order to reduce vibration of the hand shaking or the jerky motion of the camera platform to maintain image stabilization, a lens group or a subgroup could be used as a vibration compensation group to move in a direction perpendicular to the optical axis to compensate the vibration. In a preferred embodiment, two angular velocity sensors, such as gyroscopes or the like, measure the angular vibration in two orthogonal directions (pitch and yaw), and send the real-time position information to a microprocessor, which controls two actuators to drive the vibration compensation group in two orthogonal directions, both perpendicular to the optical axis. For example, one actuator acts in the vertical direction, and the other actuator acts in the horizontal direction.

FIG. 1 presents a first order analysis of image stabilization with paraxial approximation for an object at infinity. FIG. 1 is a general analysis, which decomposes an optical system with image stabilization into three parts, the lens group before the vibration compensation group (Lens$_{bf}$) 27, the vibration compensation group (Lens$_v$) 28 and the lens group after the vibration compensation group (Lens$_{af}$) 29, where the subscript "bf" denotes "before", and "af" denotes "after". The lens drawings in FIG. 1 represent the three lens groups as three positive lenses. However, each lens group in FIG. 1 could have negative optical power and could contain more subgroups, and the general image stabilization analysis remains the same. FIG. 1(a) presents the system layout without any vibration. Ray 80 is from an axial field point at infinity, which forms an image point O at the sensor. The optical axis is 30. $O_{bf}$ and $O_{af}$ are both conjugate points of the image point O. FIG. 1(b) presents the optical system with vibration, but without vibration compensation. If the angular displacement caused by vibration in one direction is α, the ray from the object point shifts from Ray 80 to Ray 81. The image point of Ray 81 is shifted to point A on the detector sensor plane. The image point displacement after Lens$_{bf}$ is $O_{bf}A_{bf}=\Delta_{bf}=f_{bf}\tan\alpha$, where $f_{bf}$ is the focal length of Lens$_{bf}$. FIG. 1(c) presents the optical system with vibration and with vibration compensation. Ray 82 is the same as Ray 81 before the vibration compensation group Lens$_v$. Lens$_v$ decenters upward by δ to shift the image point back to point O on the sensor plane, hence Ray 82 passes the conjugate point $O_{af}$. Assume the object distance for Lens$_v$ is s, and the image distance for Lens$_v$ is s', the magnification of Lens$_v$ is $m_v=s'/s$. In FIG. 1(c) specifically, s<0, s'>0. From the geometry of similar triangles, $$\delta/\Delta_{bf}=s'/(s'-s) \qquad (6)$$

Therefore, the decenter δ of the vibration compensation group Lens$_v$ driven by the actuator is $$\delta=(f_{bf}\tan\alpha\, m_v)/(m_v-1) \qquad (7)$$

If the object is not at infinity but at a finite distance, the required decenter δ (to first order) can be similarly derived as $$\delta=[f_{bf}\tan\alpha(1-m_{bf})m_v]/(m_v-1) \qquad (8)$$

where $m_{bf}$ is the magnification of the Lens$_{bf}$.

If the vibration compensation group Lens$_v$ is at the front of the optical system, i.e. there is no Lens$_{bf}$, the required decenter δ for an object at infinity could be readily derived as $$\delta=-f_v\tan\alpha \qquad (9)$$

where $f_v$ is the focal length of the vibration compensation group Lens$_v$.

If Lens$_v$ is at the front of the optical system, and object is at a finite distance, the required decenter δ can be similarly derived as $$\delta=-f_v(1-m_v)\tan\alpha \qquad (10)$$

Note that Eqs. (7) to (10) are general first order results applicable to any optical system with vibration compensation. In a zoom lens system, $f_{bf}$, $m_{bf}$ and $m_v$ could change, depending on the zoom position.

Further, the vibration compensation group movements perpendicular to the optical axis will introduce decentering aberrations. Hence, it is critical to choose lens elements that have relatively large tolerance to decenter as the vibration compensation group. Further, it's preferred to control the vibration compensation group to be small in size and weight, in order to minimize system volume and lower the power consumption.

Note in some embodiments, the actuators drive the image sensors, instead of the lens elements to compensate the vibration to achieve image stabilization.

In the disclosed embodiments, it's preferred to use at least a portion of the third lens group or at least a portion of the fourth lens group as the vibration compensation group to move in a direction perpendicular to the optical axis for image stabilization.

Based on the spectral coverage, the disclosed embodiments can be divided into two spectral types. The first spectral type covers 400 nm to 900 nm, from visible spectrum to near-infrared spectrum, including Embodiment 1, Embodiment 3 and Embodiment 5, and the second spectral type covers 400 nm to 1700 nm, from visible spectrum through near-infrared to short-wave infrared spectrum, including Embodiment 2, Embodiment 4, and Embodiment 6.

Based on the effective focal length (EFL) of the system, the embodiments can be divided into three EFL types. The first EFL type operates in EFL of 30 mm to 300 mm, including Embodiment 1 and Embodiment 2. The second EFL type operates in EFL of 20 mm to 200 mm, including Embodiment 3 and Embodiment 4. The third EFL type operates in EFL of 10 mm to 100 mm, including Embodiment 5 and Embodiment 6.

Embodiment 1-5 are designed with all spherical surfaces, including flat surfaces with radius of infinity. Embodiment 6 contains one aspherical surface at the front surface and the rest surfaces are all spherical.

In all of the embodiments, the order of a surface is counted from the object side to the image side. The i-th surface has a radius of curvature of Ri, and a thickness Di, where Di is the thickness interval between the i-th surface and the (i+1)-th surface.

The refractive index and the Abbe number of an optical lens material are evaluated with reference to the d-line of wavelength 587.6 nm, and represented by $n_d$ and $V_d$, respectively. The Abbe number $V_d$ is $V_d=(n_d-1)/(n_F-n_C)$, where $n_F$ is the refractive index of an optical material evaluated at the F-line of 486.1 nm, and $n_C$ is the refractive index of an optical material evaluated at the C-line of 656.3 nm.

An aspherical surface is numerically described by the expression:

$$z(s) = \frac{cs^2}{1+\sqrt{1-(k+1)c^2s^2}} + As^4 + Bs^6 + Cs^8 + Ds^{10} + Es^{12},$$

where z is the sag or displacement of the aspherical surface in the optical axis direction, calculated from the vertex of the surface. s is the transverse distance from the optical axis, and $s^2=x^2+y^2$, and (x, y) are the coordinates of a point on the surface in a transverse plane perpendicular to the optical axis. c is the curvature of the surface, which is the inverse of the radius R. k is the conic constant. A, B, C, D and E are the fourth-order, sixth-order, eighth-order, tenth-order and twelfth-order aspherical coefficients. Higher order aspherical coefficients could be further added, if necessary. In this invention, an aspherical surface is denoted by an asterisk symbol * after its surface number.

Embodiment 1

Figure 2:
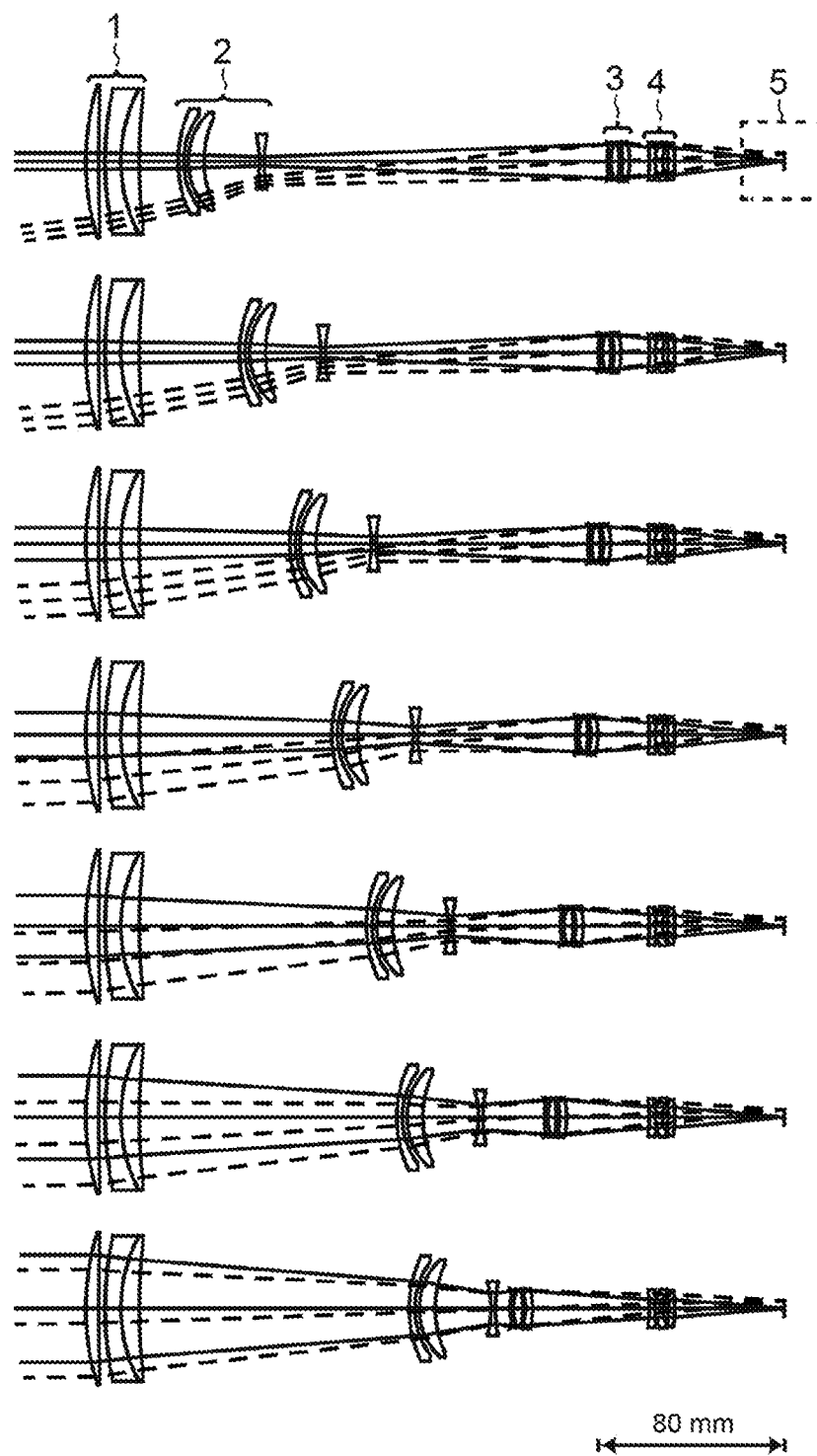
FIG. 2-5 are for Embodiment 1 of a design with effective focal length (EFL) of 30 mm to 300 mm and spectrum of 400 nm to 900 nm.

Now referring to FIG. 2, which presents Embodiment 1 of the zoom lens system at seven representative zoom positions (Z1-Z7), from the wide-angle end (Z1) above to the telephoto end (Z7) below. Embodiment 1 covers the spectral range of 400 nm to 900 nm, from visible to near-infrared. The solid lines represent rays from the axial field point, and the dashed lines represent rays from the full field point, and the same line styles of rays are used for the other embodiments in this invention. The effective focal lengths of the system at these seven zoom positions are, in order from Zoom 1 (Z1) position above to Zoom 7 (Z7) position below, EFL=30 mm, 44.03 mm, 64.63 mm, 94.87 mm, 139.25 mm, 204.39 mm, 300 mm, in a geometric sequence.

All optical surfaces in Embodiment 1 are spherical surfaces, including flat surfaces with radius of infinity. The overall length of Embodiment 1 from Surface 1 (Table 1) to the image plane is 308 mm. From the object side to the image side, Surfaces 1 to 5 constitute the first lens group 1 (G1); Surfaces 6 to 11 constitute the second lens group 2 (G2); Surface 12 is the aperture stop; Surfaces 13 to 17 constitute the third lens group 3 (G3); Surfaces 18 to 23 constitute the fourth lens group 4 (G4). A detection system 5 follows the zoom lens groups, and it is sensitive to the visible and near-infrared spectral range of 400 nm to 900 nm. The detection system contains the image plane Surface 24 in Embodiment 1. The aperture stop maintains a fixed diameter through zoom, and it's located at a fixed distance to G3, and moves along with G3 during the zoom motion.

Figure 3:
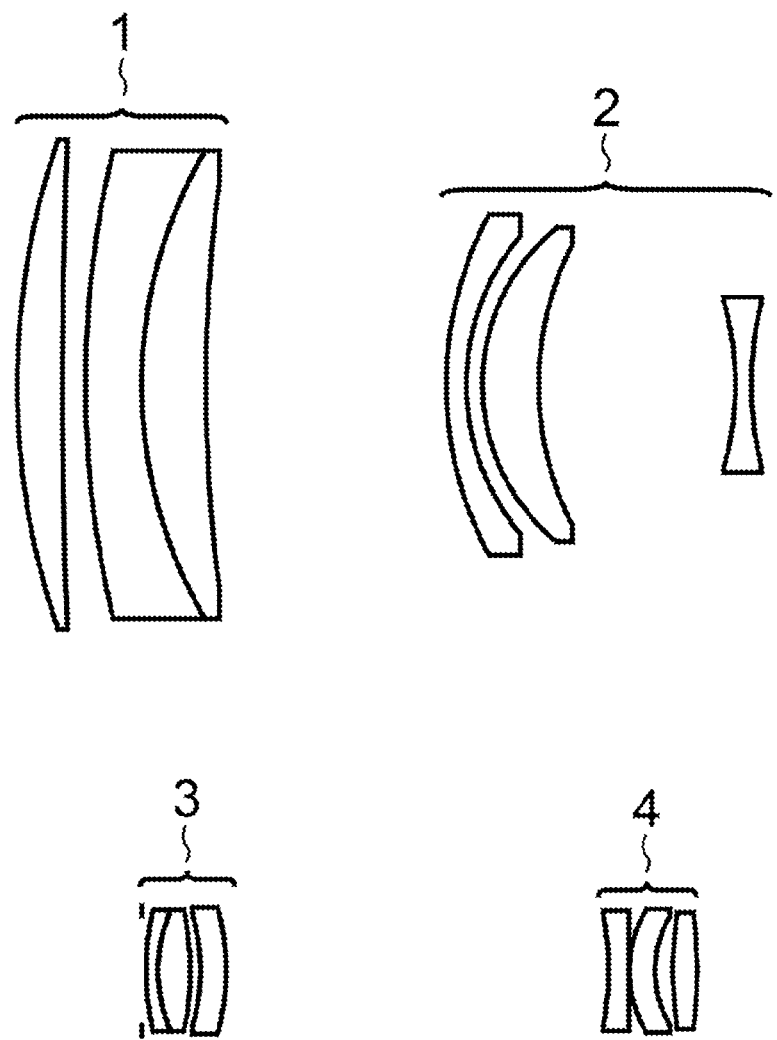

FIG. 3 presents the detailed lens shapes of each lens group of Embodiment 1.

Figure 4:
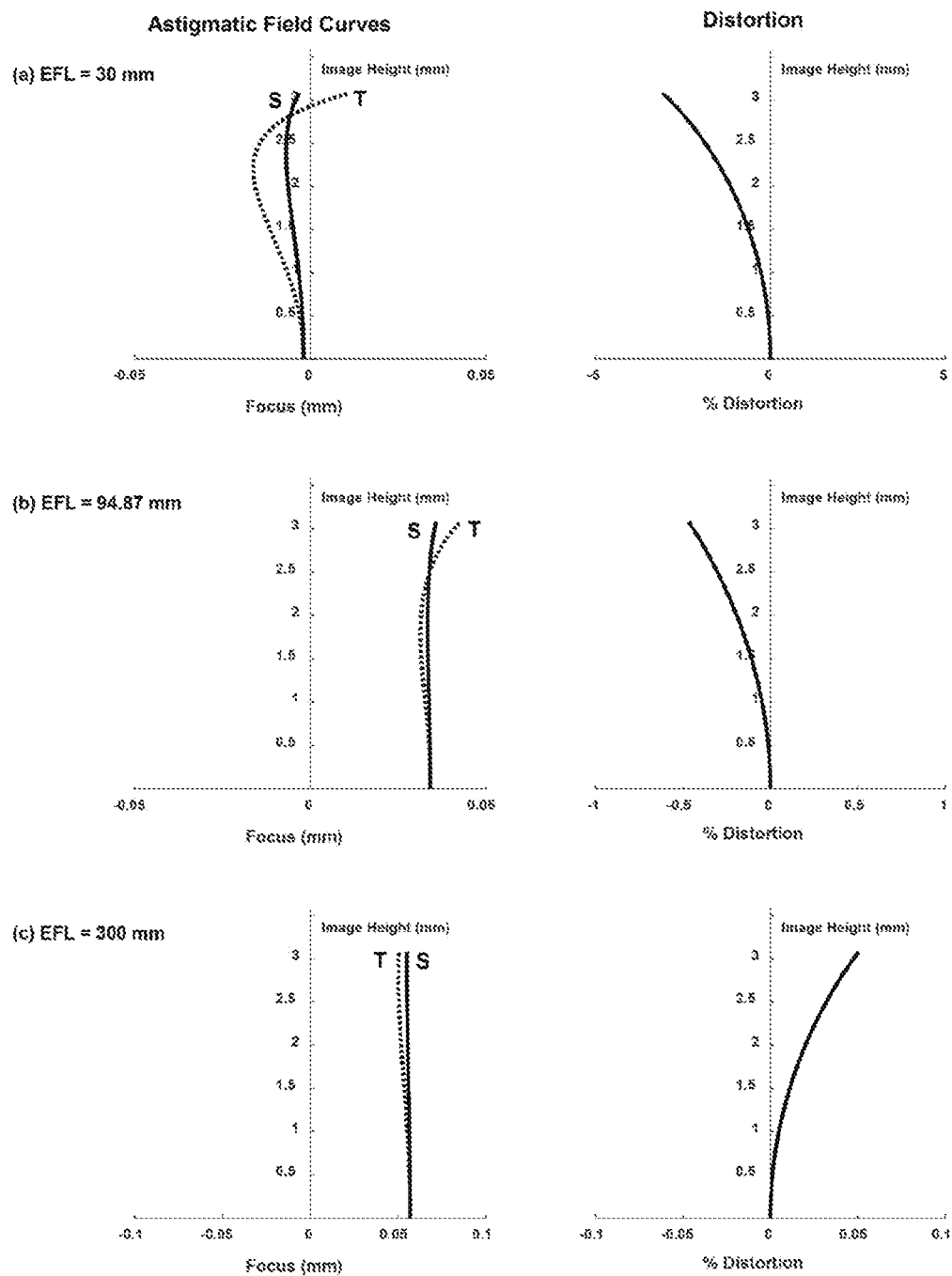

FIG. 4 (a)-(c) present Embodiment 1 astigmatic field curves on the left and distortion on the right. In the astigmatic field curves, the solid line is the sagittal field curve (S), and the dashed line is the tangential field curve (T), and the same line styles of these two curves are used throughout the rest field curves figures in this patent.

Figure 5:
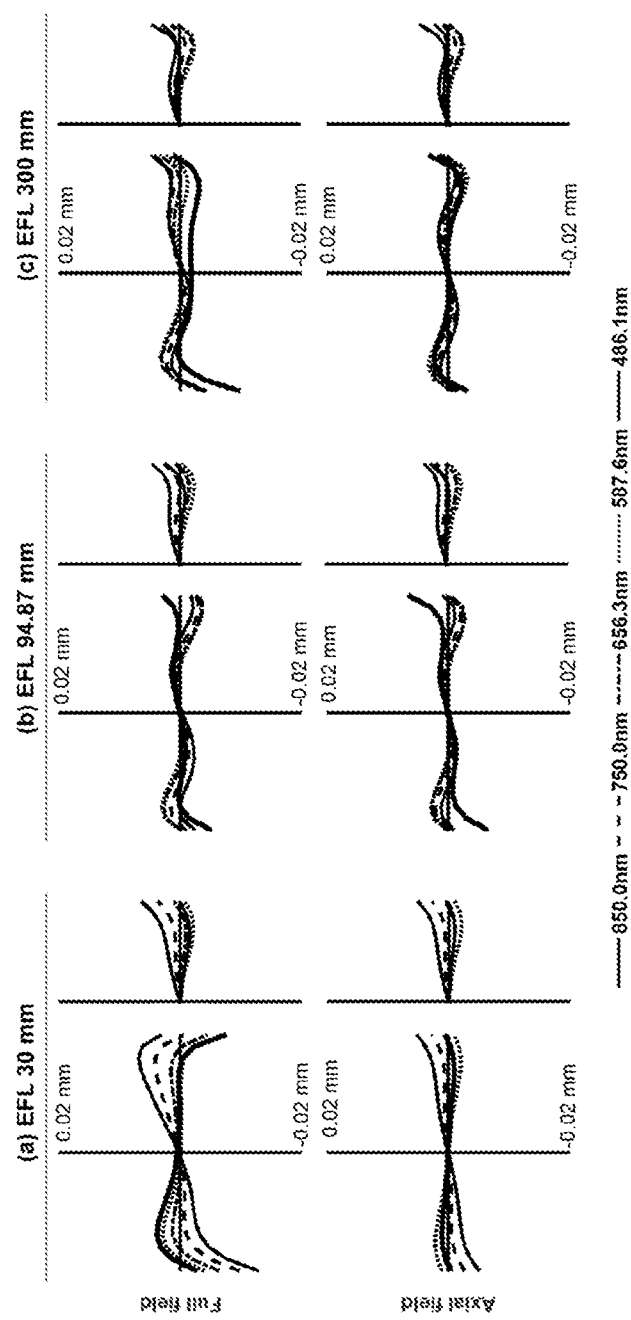

FIG. 5 presents the transverse ray aberration plots of Embodiment 1 for Z1, Z4 and Z7. For each zoom position, the tangential ray fan is on the left and the sagittal ray fan is on the right. Only half of the sagittal ray fan is shown in this patent due to its antisymmetric shape across the pupil.

The numerical details of Embodiment 1 are listed in Table 1, and the length values are in units of mm. The variable data listed are at three representative zoom positions, the wide-angle end of Zoom 1 (Z1), the intermediate Zoom 4 (Z4) and the telephoto end of Zoom 7 (Z7).

TABLE 1

| Surface Number | Radius of curvature R | Thickness D | $n_d$ | $V_d$ | Semi-Aperture |
|---|---|---|---|---|---|
| 1 | 92.5644 | 5.6157 | 1.438750 | 94.9460 | 28.33 |
| 2 | 762.4479 | 2.8798 | | | 28.04 |
| 3 | 123.1569 | 7.0000 | 1.713003 | 53.8316 | 26.81 |
| 4 | 56.8924 | 8.0000 | 1.438750 | 94.9460 | 24.73 |
| 5 | 190.5681 | D5 | | | 24.30 |
| 6 | 44.3896 | 2.5000 | 1.438750 | 94.9460 | 19.69 |
| 7 | 28.5880 | 2.0000 | | | 18.36 |
| 8 | 25.0000 | 7.0000 | 1.637750 | 42.4102 | 18.11 |
| 9 | 38.0782 | 24.5000 | | | 16.82 |
| 10 | −37.1287 | 2.0000 | 1.618000 | 63.3897 | 9.86 |
| 11 | 42.5436 | D11 | | | 9.43 |
| 12-Stop | Infinity | 0.5000 | | | 6.73 |
| 13 | 32.0783 | 1.5000 | 1.613360 | 44.4937 | 6.86 |
| 14 | 18.2676 | 4.0000 | 1.438750 | 94.9460 | 6.82 |
| 15 | −35.0850 | 1.2760 | | | 6.87 |
| 16 | −24.8217 | 3.2000 | 1.784720 | 25.6800 | 6.82 |
| 17 | −28.2964 | D17 | | | 7.13 |
| 18 | −36.6084 | 2.5000 | 1.846660 | 23.7799 | 6.56 |
| 19 | 1608.5474 | 0.1000 | | | 6.74 |
| 20 | 14.5946 | 3.2000 | 1.729160 | 54.4992 | 6.94 |
| 21 | 13.2624 | 2.2302 | | | 6.43 |
| 22 | 49.5554 | 2.9698 | 1.805182 | 25.4320 | 6.55 |
| 23 | −63.7506 | 48.4121 | | | 6.57 |
| 24 | Infinity | | | | 3.09 |

| Variable data | | | |
|---|---|---|---|
| | Wide angle end (Z1) | Intermediate (Z4) | Telephoto end (Z7) |
| Focal length | 30 | 94.87 | 300 |
| F/# | 4.52 | 5.34 | 7.00 |
| Half field of view | 6.05° | 1.87° | 0.59° |
| D5 | 17.1803 | 84.9566 | 119.1070 |
| D11 | 150.7051 | 68.9653 | 6.0047 |
| D17 | 8.7280 | 22.6915 | 51.5018 |

It's preferred to use the third lens group in Embodiment 1 as the vibration compensation group to move in a direction perpendicular to the optical axis for image stabilization. Other groups or subgroups of the zoom lens system could also be used as the vibration compensation group.

Embodiment 2

Figure 6:
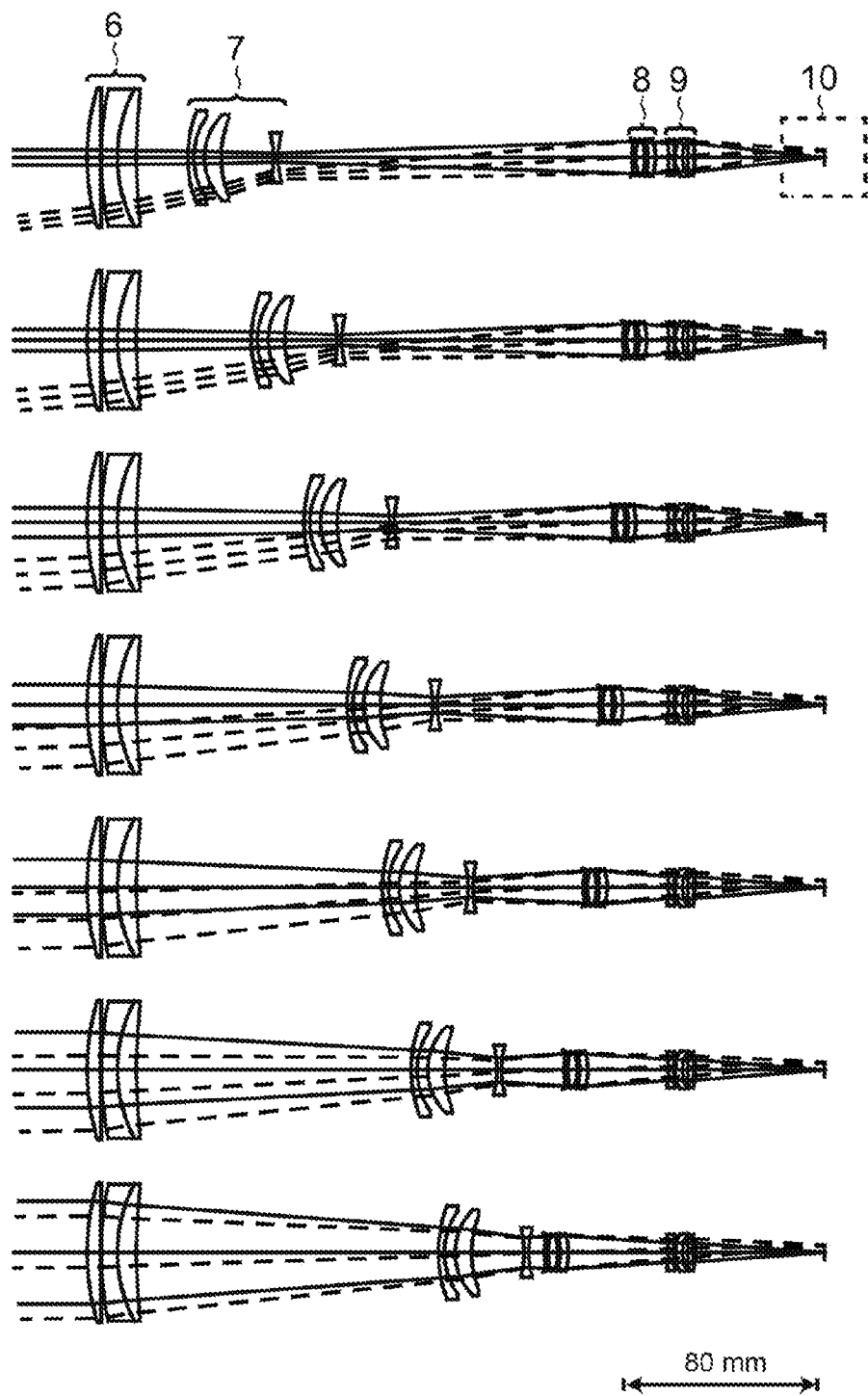
FIG. 6-9 are for Embodiment 2 of a design with EFL of 30 mm to 300 mm and spectrum of 400 nm to 1700 nm.

FIG. 6 presents Embodiment 2, which covers a broad spectral range of 400 nm to 1700 nm, from visible to short-wave infrared. The system effective focal lengths at the seven representative zoom positions (Z1-Z7) are, in order from the wide-angle end above to the telephoto end below, EFL=30 mm, 44.03 mm, 64.63 mm, 94.87 mm, 139.25 mm, 204.39 mm, 300 mm, in a geometric sequence.

All optical surfaces in Embodiment 2 are spherical surfaces, including flat surfaces with radius of infinity. The overall length of Embodiment 2 from Surface 1 (Table 2) to the image plane is 310 mm. From the object side to the image side, Surfaces 1 to 5 constitute the first lens group 6 (G1); Surfaces 6 to 11 constitute the second lens group 7 (G2); Surface 12 is the aperture stop; Surfaces 13 to 17 constitute the third lens group 8 (G3); Surfaces 18 to 23 constitute the fourth lens group 9 (G4). A detection system 10 follows the zoom lens groups, and it is sensitive to the visible to short wave-infrared spectral range of 400 nm to 1700 nm. The detection system contains the image plane Surface 24 in Embodiment 2. The aperture stop maintains a fixed diameter through zoom, and it's located at a fixed distance to G3, and moves along with G3 during the zoom motion.

Figure 7:
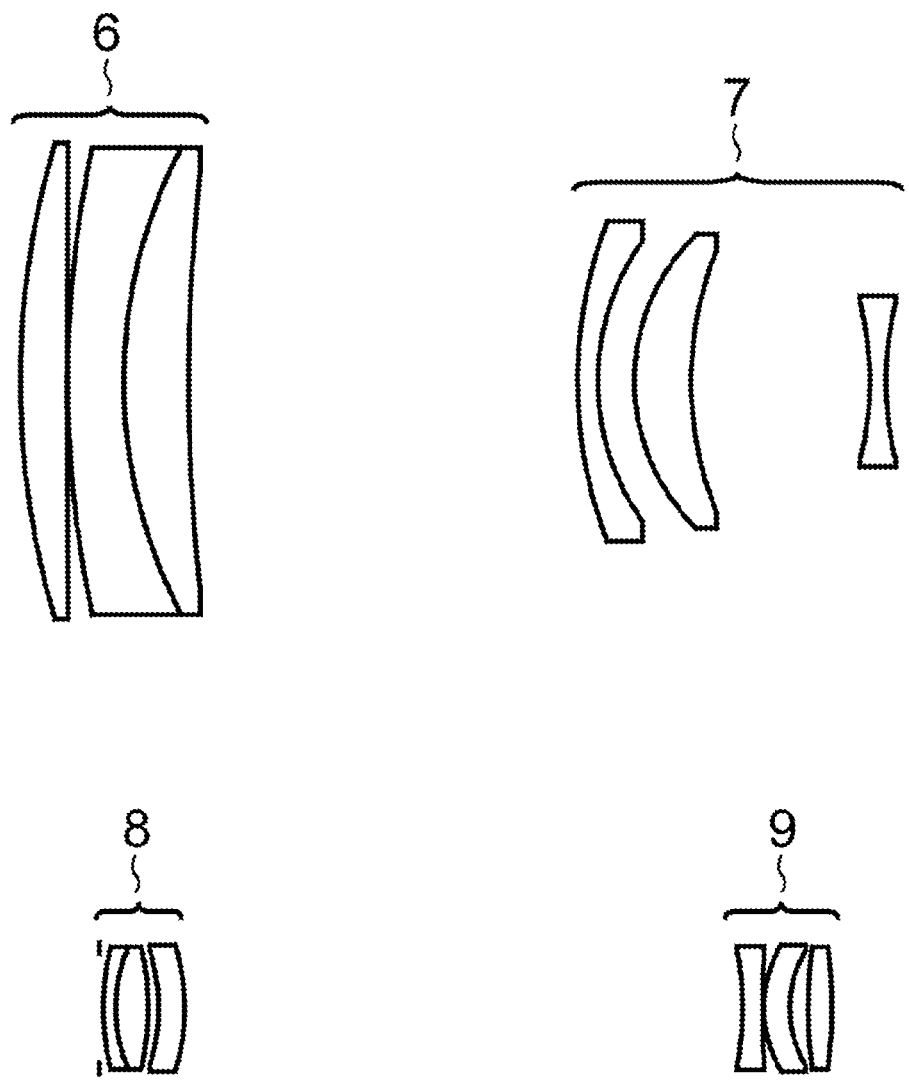

FIG. 7 presents the detailed lens shapes of each lens group of Embodiment 2.

Figure 8:
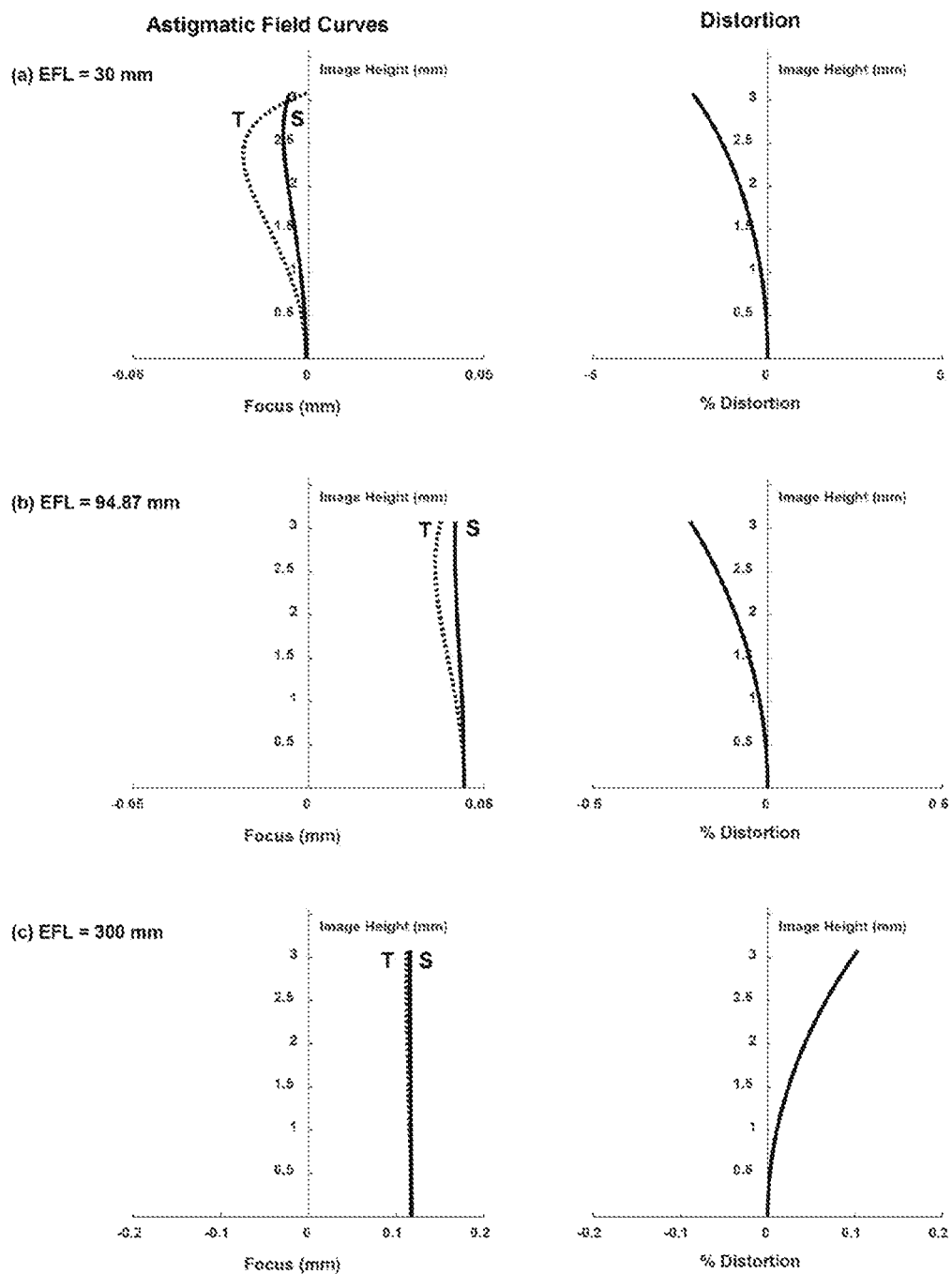

FIG. 8 (a)-(c) present Embodiment 2 astigmatic field curves on the left and distortion on the right at Z1, Z4, and Z7.

Figure 9:
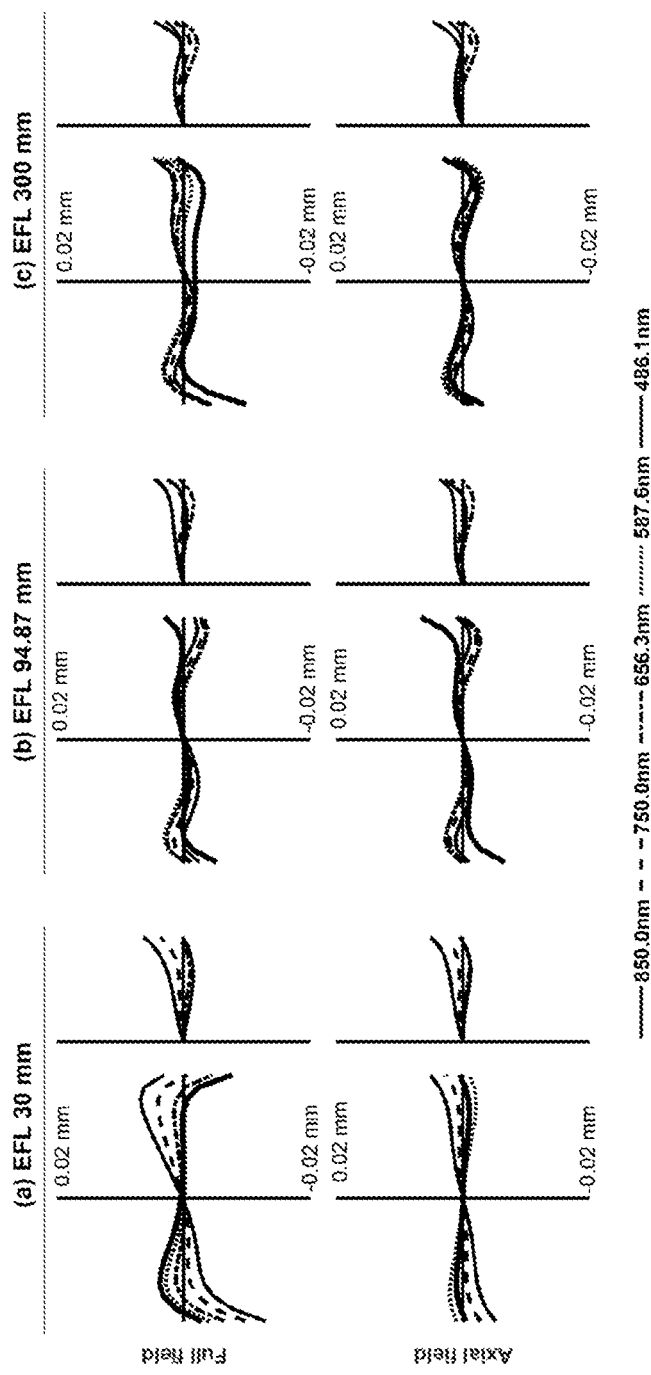

FIG. 9 presents the transverse ray aberration plots of Embodiment 2 at Z1, Z4, and Z7. For each zoom position, the tangential ray fan is on the left and the sagittal ray fan is on the right.

The numerical details of Embodiment 2 are listed in Table 2, and the length values are in units of mm. The variable data listed are at three representative zoom positions: Z1, Z4, and Z7.

TABLE 2

| Surface Number | Radius of curvature | Thickness | $n_d$ | $V_d$ | Semi-Aperture |
|---|---|---|---|---|---|
| 1 | 101.5878 | 5.7287 | 1.438750 | 94.9460 | 27.52 |
| 2 | 5251.5950 | 0.1000 | | | 27.34 |
| 3 | 136.9000 | 6.8975 | 1.713003 | 53.8316 | 26.99 |
| 4 | 60.9126 | 7.9997 | 1.438750 | 94.9460 | 25.44 |
| 5 | 227.9136 | D5 | | | 25.03 |
| 6 | 54.2248 | 2.5000 | 1.438750 | 94.9460 | 18.28 |
| 7 | 29.4825 | 4.5022 | | | 17.09 |
| 8 | 25.0000 | 7.0000 | 1.637750 | 42.4102 | 16.73 |
| 9 | 42.9164 | 21.9978 | | | 15.49 |
| 10 | −39.6915 | 2.0000 | 1.618000 | 63.3897 | 9.46 |
| 11 | 39.0130 | D11 | | | 9.04 |
| 12-Stop | Infinity | 0.5000 | | | 6.69 |
| 13 | 32.1224 | 1.5000 | 1.613360 | 44.4937 | 6.81 |
| 14 | 18.4464 | 4.0000 | 1.438750 | 94.9460 | 6.77 |
| 15 | −32.8752 | 1.3008 | | | 6.82 |
| 16 | −23.0002 | 3.2000 | 1.784720 | 25.6800 | 6.76 |
| 17 | −26.5252 | D17 | | | 7.08 |
| 18 | −35.2220 | 2.5000 | 1.846660 | 23.7799 | 6.66 |
| 19 | 209.7945 | 0.1000 | | | 6.84 |
| 20 | 14.9447 | 3.2000 | 1.729160 | 54.4992 | 7.08 |
| 21 | 13.6622 | 2.2505 | | | 6.62 |
| 22 | 50.2854 | 2.9495 | 1.805182 | 25.4320 | 6.76 |
| 23 | −51.0811 | 54.5979 | | | 6.81 |
| 24 | Infinity | | | | 3.09 |

| Variable data | | | |
|---|---|---|---|
| | Wide angle end (Z1) | Intermediate (Z4) | Telephoto end (Z7) |
| Focal length | 30 | 94.87 | 300 |
| F/# | 4.72 | 5.58 | 7.00 |
| Half field of view | 6.00° | 1.87° | 0.59° |
| D5 | 21.5969 | 88.5081 | 126.9401 |
| D11 | 148.0881 | 67.4335 | 6.0445 |
| D17 | 5.5000 | 19.2435 | 42.2004 |

It's preferred to use the third lens group in Embodiment 2 as the vibration compensation group to move in a direction perpendicular to the optical axis for image stabilization. Other groups or subgroups of the zoom lens system could also be used as the vibration compensation group.

Embodiment 3

Figure 10:
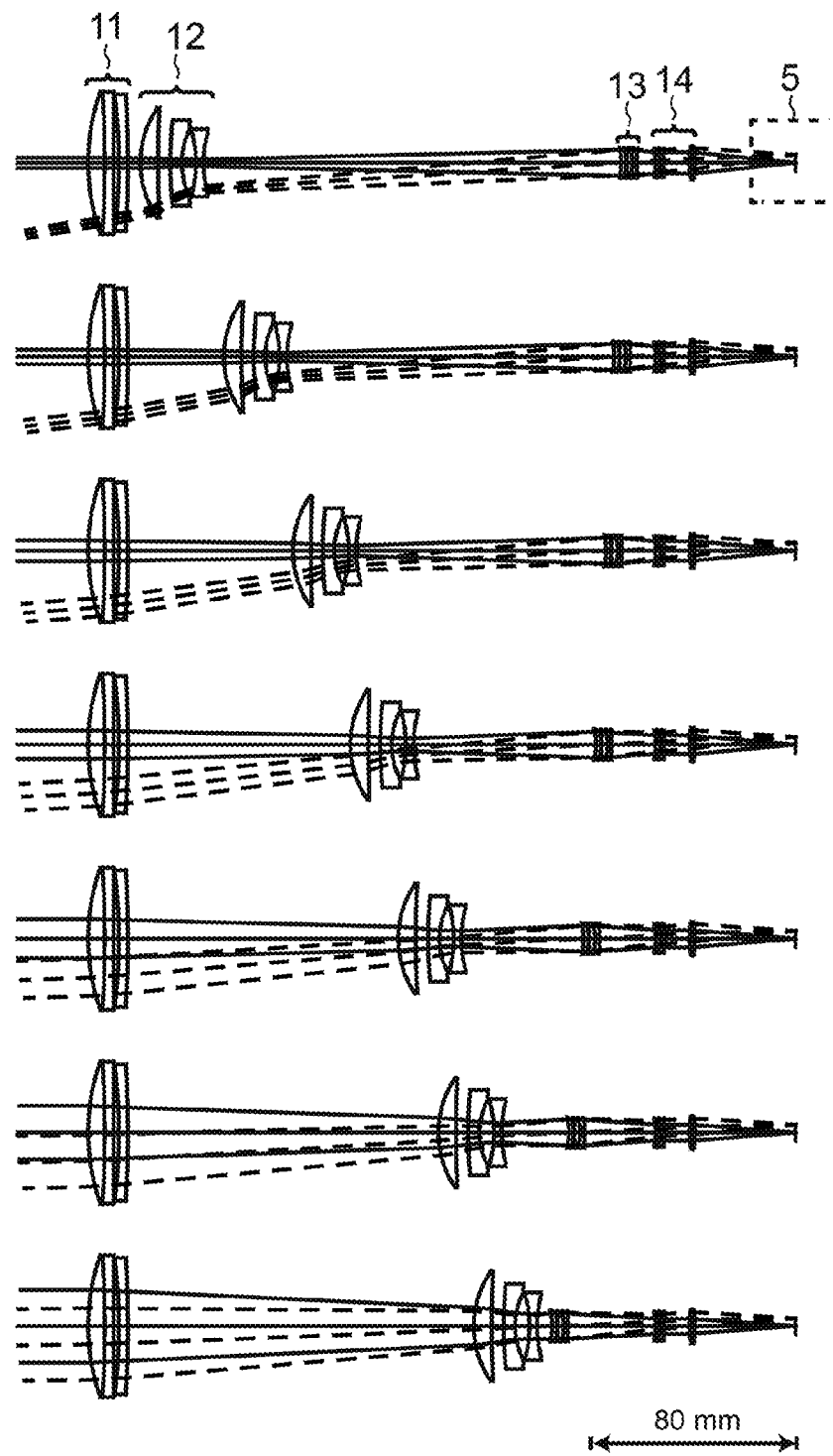
FIG. 10-13 are for Embodiment 3 of a design with EFL of 20 mm to 200 mm and spectrum of 400 nm to 900 nm.

FIG. 10 presents Embodiment 3, which covers the spectral range of 400 nm to 900 nm, from visible to near-infrared. The system effective focal lengths at the seven representative zoom positions (Z1-Z7) are, in order from the wide-angle end above to the telephoto end below, EFL=20 mm, 29.36 mm, 43.09 mm, 63.25 mm, 92.83 mm, 136.26 mm, 200 mm, in a geometric sequence.

All optical surfaces in Embodiment 3 are spherical surfaces, including flat surfaces with radius of infinity. The overall length of Embodiment 3 from Surface 1 (Table 3) to the image plane is 280 mm. From the object side to the image side, Surfaces 1 to 5 constitute the first lens group 11 (G1); Surfaces 6 to 11 constitute the second lens group 12 (G2); Surface 12 is the aperture stop; Surfaces 13 to 17 constitute the third lens group 13 (G3); Surfaces 18 to 22 constitute the fourth lens group 14 (G4). A detection system 5 follows the zoom lens groups, and it is sensitive to the visible to near-infrared spectral range of 400 nm to 900 nm. The detection system contains the image plane Surface 23 in Embodiment 3. The aperture stop maintains a fixed diameter through zoom, and it's located at a fixed distance to G3, and moves along with G3 during zoom.

Figure 11:
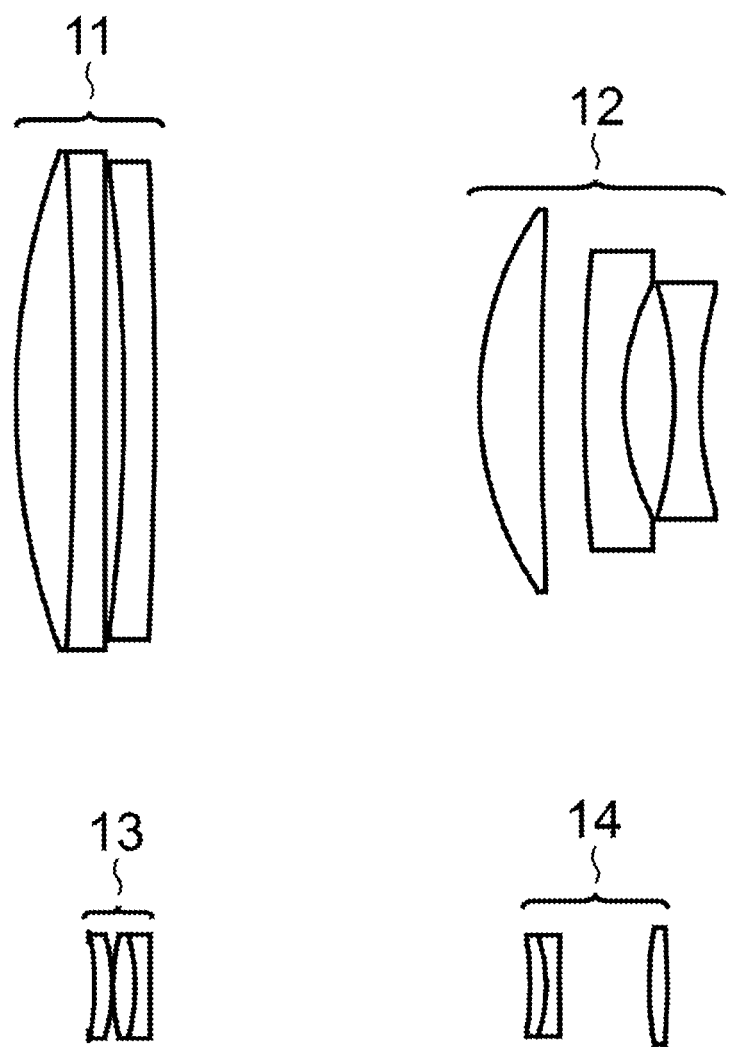

FIG. 11 presents the detailed lens shapes of each lens group of Embodiment 3.

Figure 12:
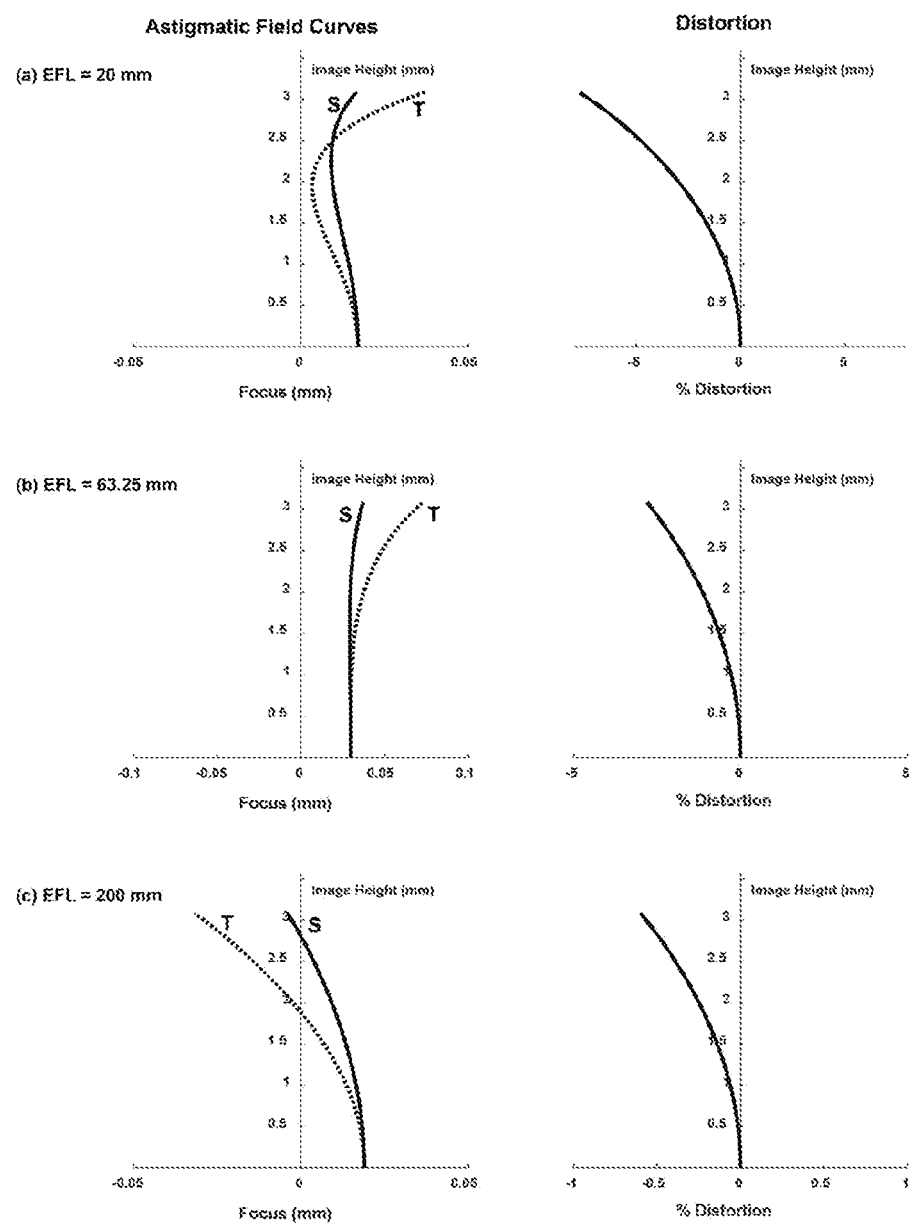

FIG. 12 (a)-(c) present Embodiment 3 astigmatic field curves on the left and distortion on the right at Z1, Z4, and Z7.

Figure 13:
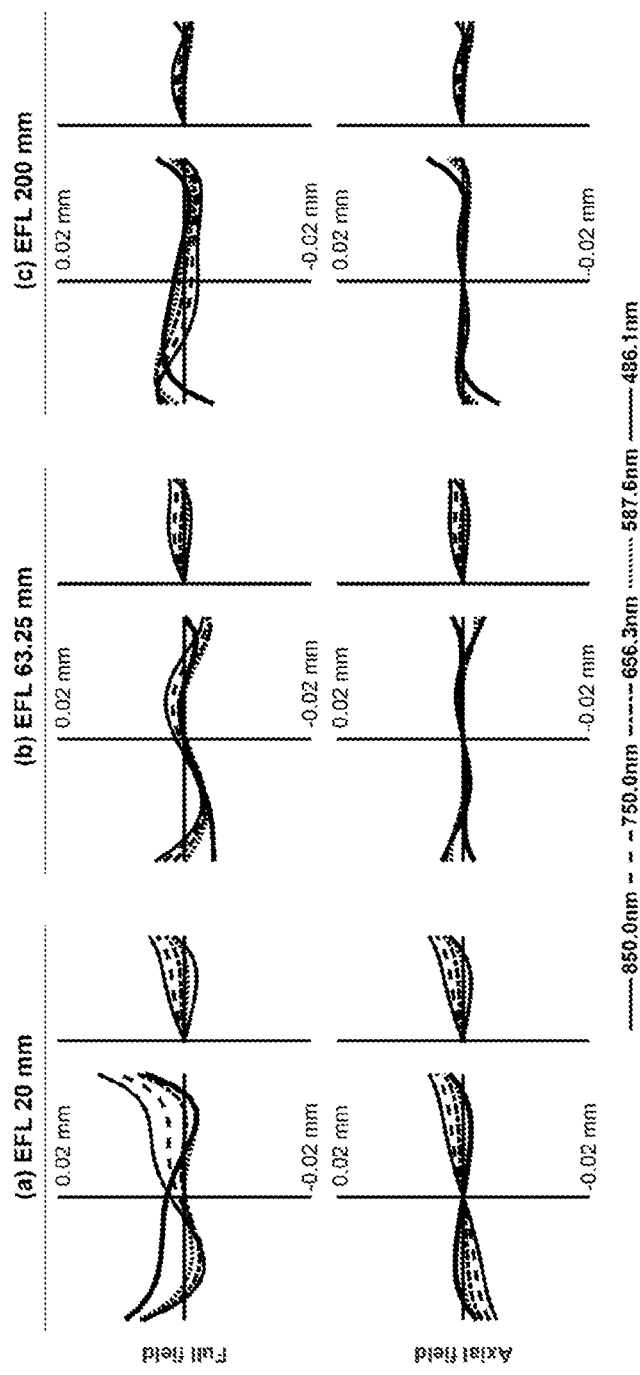

FIG. 13 presents the transverse ray aberration plots of Embodiment 3 at Z1, Z4, and Z7. For each zoom position, the tangential ray fan is on the left and the sagittal ray fan is on the right.

The numerical details of Embodiment 3 are listed in Table 3, and the length values are in units of mm. The variable data listed are at three representative zoom positions: Z1, Z4, and Z7.

TABLE 3

| Surface Number | Radius of curvature | Thickness | $n_d$ | $V_d$ | Semi-Aperture |
|---|---|---|---|---|---|
| 1 | 82.2204 | 6.5458 | 1.438750 | 94.9460 | 24.96 |
| 2 | −452.2609 | 3.5000 | 1.605683 | 43.7207 | 24.54 |
| 3 | Infinity | 2.1498 | | | 23.77 |
| 4 | −205.7219 | 3.5000 | 1.637750 | 42.4102 | 23.53 |
| 5 | −524.0193 | D5 | | | 22.99 |
| 6 | 38.0000 | 7.0000 | 1.749504 | 35.3325 | 20.15 |
| 7 | 394.5052 | 4.8245 | | | 19.47 |
| 8 | 163.0008 | 4.5000 | 1.704000 | 39.3844 | 15.59 |
| 9 | 28.0000 | 5.6755 | | | 12.64 |
| 10 | −45.8917 | 3.0000 | 1.572500 | 57.5493 | 12.25 |
| 11 | 44.1991 | D11 | | | 11.49 |
| 12-Stop | Infinity | 0.6930 | | | 5.05 |
| 13 | −33.0000 | 2.0000 | 1.658440 | 50.8829 | 5.08 |
| 14 | −20.6738 | 0.1000 | | | 5.28 |
| 15 | 24.6736 | 2.5000 | 1.438750 | 94.9460 | 5.31 |
| 16 | −21.7358 | 1.7000 | 1.637750 | 42.4102 | 5.25 |
| 17 | 751.1496 | D17 | | | 5.22 |
| 18 | −36.6826 | 1.8000 | 1.618000 | 63.3897 | 5.01 |
| 19 | −18.0000 | 1.5000 | 1.651600 | 58.5178 | 5.06 |
| 20 | 767.5653 | 10.2000 | | | 5.15 |
| 21 | 41.0690 | 2.0000 | 1.691002 | 54.7084 | 5.93 |
| 22 | −95.0637 | 40.0000 | | | 5.91 |
| 23 | Infinity | | | | 3.09 |

| Variable data | | | |
|---|---|---|---|
| | Wide angle end (Z1) | Intermediate (Z4) | Telephoto end (Z7) |
| Focal length | 20 | 63.25 | 200 |
| F/# | 4.86 | 5.65 | 7.00 |
| Half field of view | 9.49° | 2.87° | 0.89° |
| D5 | 5.0000 | 88.1151 | 136.9815 |
| D11 | 164.5217 | 71.4199 | 5.2851 |
| D17 | 7.2897 | 17.2765 | 34.5449 |

It's preferred to use the doublet in the fourth lens group (Surfaces 18 to 20) in Embodiment 3 as the vibration compensation group to move in a direction perpendicular to the optical axis for image stabilization. Other groups or subgroups of the zoom lens system could also be used as the vibration compensation group.

Embodiment 4

Figure 14:
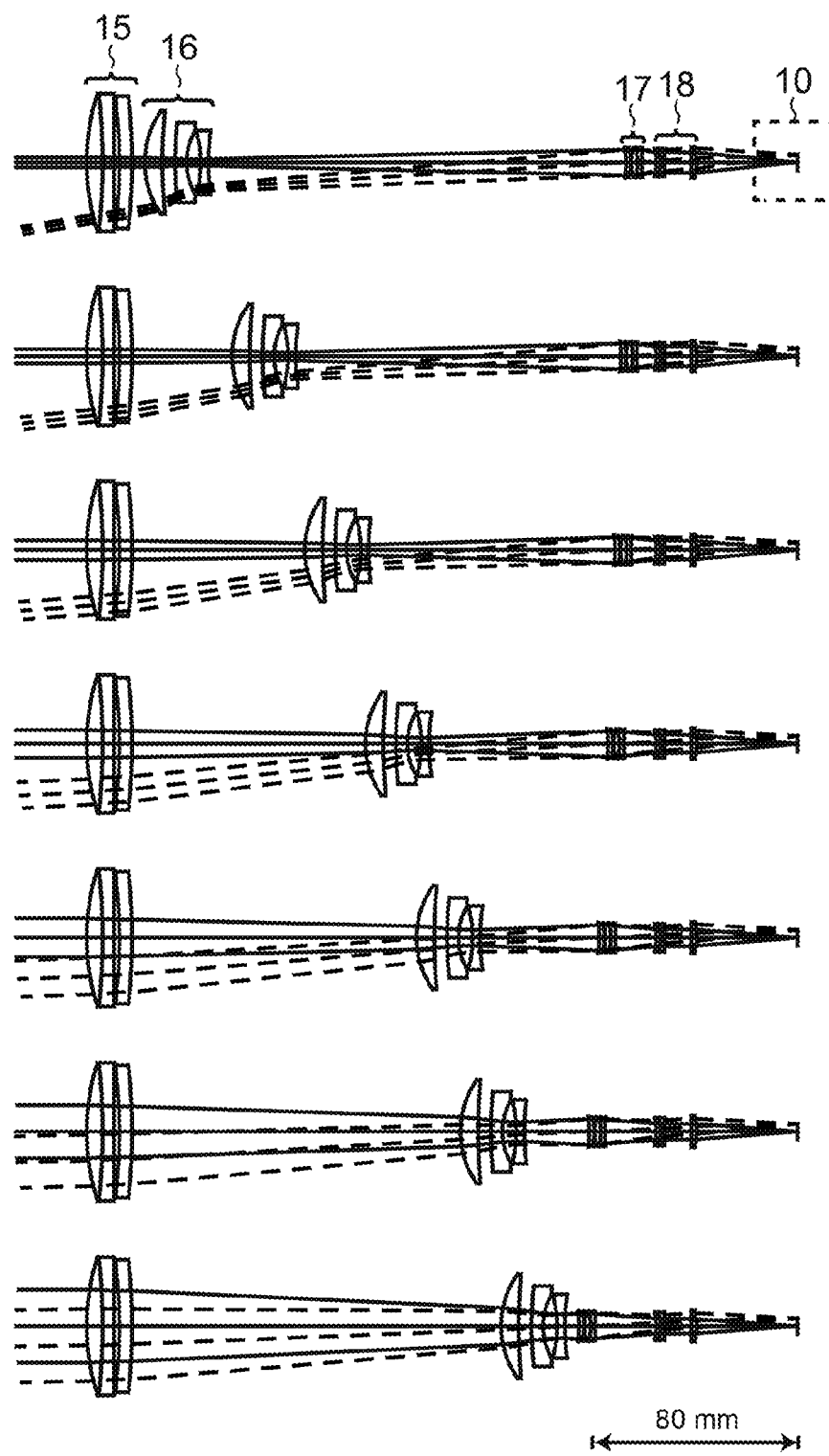
FIG. 14-17 are for Embodiment 4 of a design with EFL of 20 mm to 200 mm and spectrum of 400 nm to 1700 nm.

FIG. 14 presents Embodiment 4, which covers the spectral range of 400 nm to 1700 nm, from visible to short-wave infrared. The system effective focal lengths at the seven representative zoom positions (Z1-Z7) are, in order from the wide-angle end above to the telephoto end below, EFL=20 mm, 29.36 mm, 43.09 mm, 63.25 mm, 92.83 mm, 136.26 mm, 200 mm, in a geometric sequence.

All optical surfaces in Embodiment 4 are spherical surfaces, including flat surfaces with radius of infinity. The overall length of Embodiment 4 from Surface 1 (Table 4) to the image plane is 281.22 mm. From the object side to the image side, Surfaces 1 to 5 constitute the first lens group 15 (G1); Surfaces 6 to 11 constitute the second lens group 16 (G2); Surface 12 is the aperture stop; Surfaces 13 to 17 constitute the first lens group 17 (G3); Surfaces 18 to 22 comprise constitute the first lens group 18 (G4). A detection system 10 follows the zoom lens groups, and it is sensitive to the visible to short wave-infrared spectral range of 400 nm to 1700 nm. The detection system contains the image plane Surface 23 in Embodiment 4. The aperture stop maintains a fixed diameter through zoom, and it's located at a fixed distance to G3, and moves along with G3 during the zoom motion.

Figure 15:
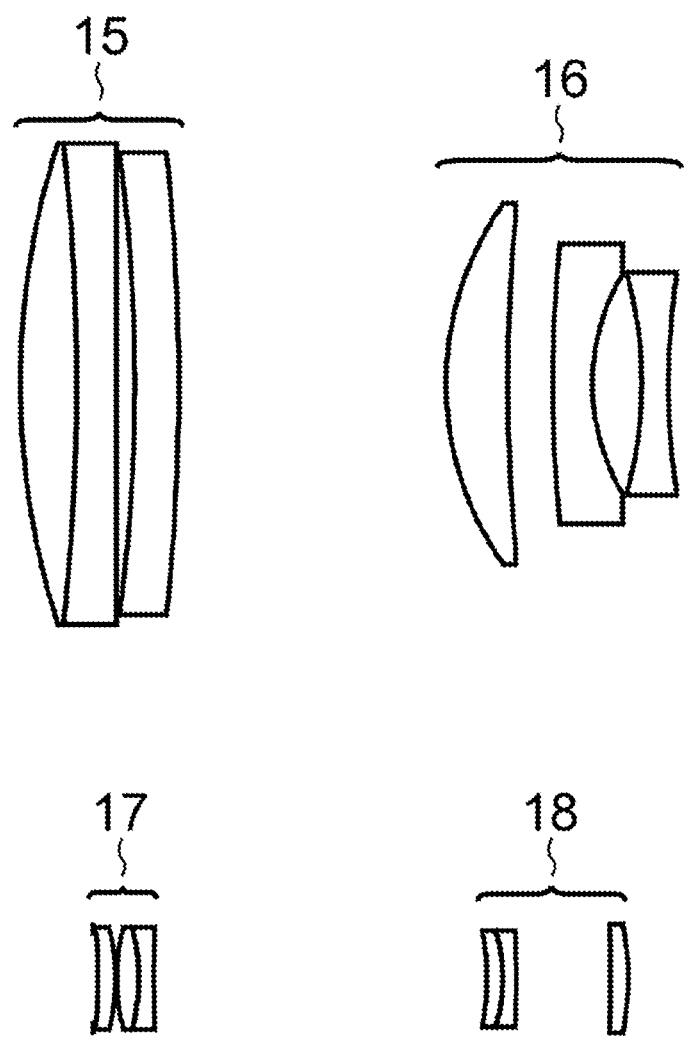

FIG. 15 presents the detailed lens shapes of each lens group of Embodiment 4.

Figure 16:
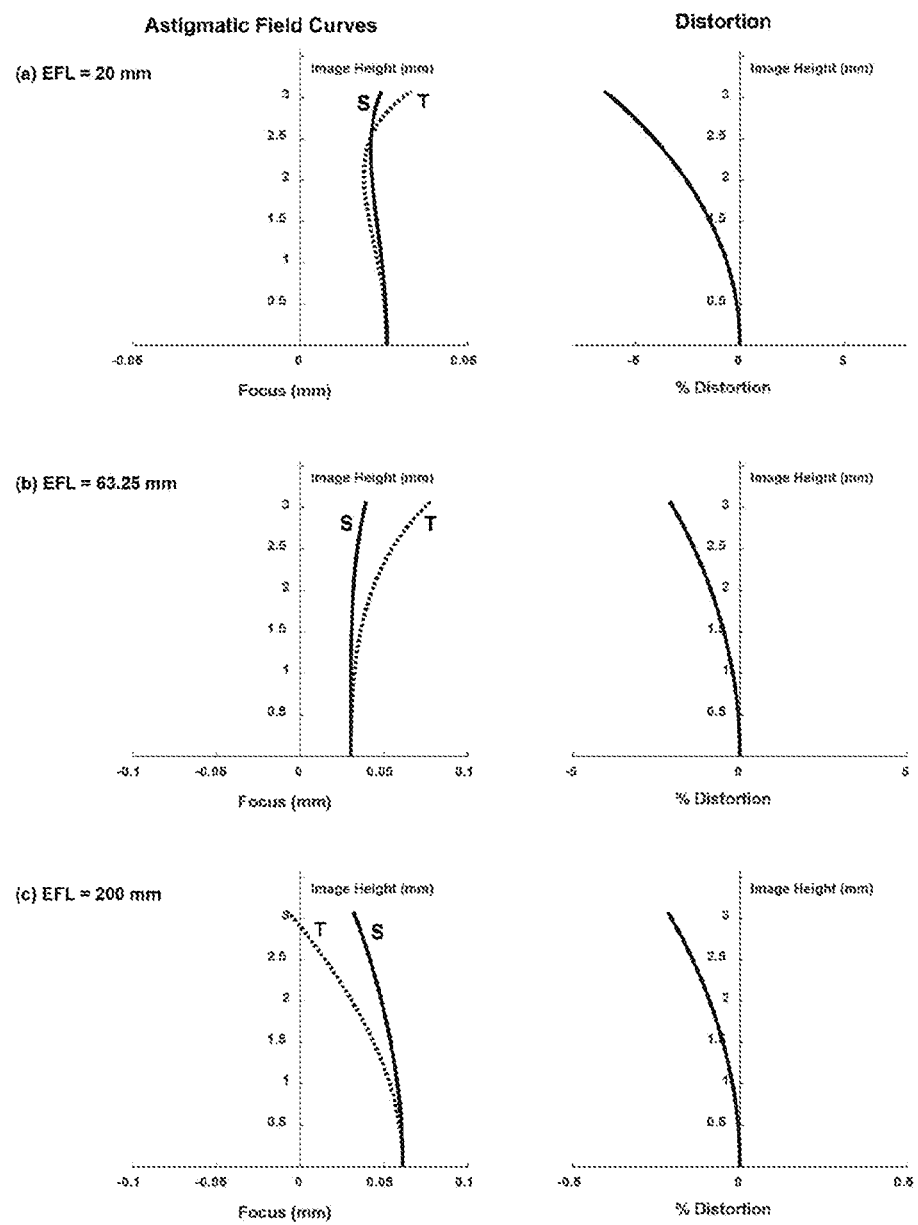

FIG. 16 (a)-(c) present Embodiment 4 astigmatic field curves on the left and distortion on the right at Z1, Z4 and Z7.

Figure 17:
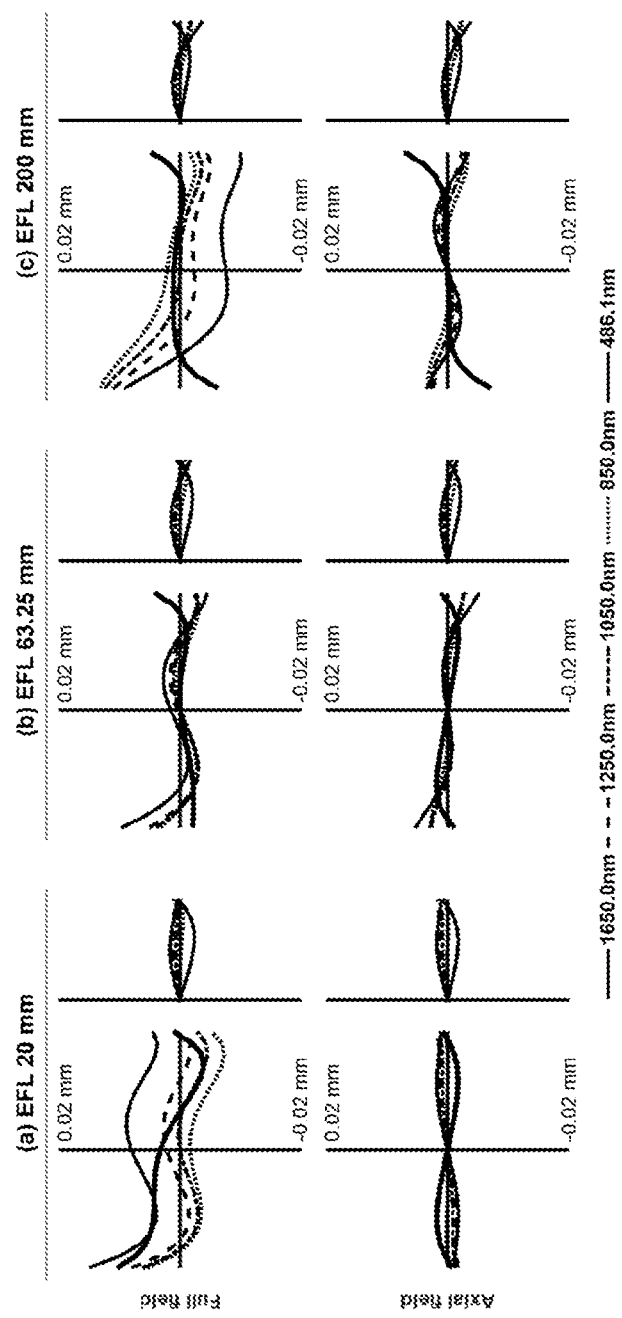

FIG. 17 presents the transverse ray aberration plots of Embodiment 4 at Z1, Z4 and Z7. For each zoom position, the tangential ray fan is on the left and the sagittal ray fan is on the right.

The numerical details of Embodiment 4 are listed in Table 4, and the length values are in units of mm. The variable data listed are at three representative zoom positions: Z1, Z4 and Z7.

TABLE 4

| Surface Number | Radius of curvature | Thickness | $n_d$ | $V_d$ | Semi-Aperture |
|---|---|---|---|---|---|
| 1 | 88.5333 | 6.3368 | 1.438750 | 94.9460 | 23.72 |
| 2 | −245.3617 | 4.5229 | 1.720028 | 50.6222 | 23.48 |
| 3 | Infinity | 2.0691 | | | 23.01 |
| 4 | −195.5429 | 5.0000 | 1.784720 | 25.7566 | 22.91 |
| 5 | −240.4180 | D5 | | | 22.76 |
| 6 | 35.0000 | 7.0000 | 1.749504 | 35.3325 | 18.91 |
| 7 | 197.9663 | 5.0799 | | | 18.01 |
| 8 | 150.1801 | 4.5000 | 1.720000 | 41.9785 | 14.58 |
| 9 | 24.0000 | 5.5994 | | | 11.78 |
| 10 | −44.7233 | 3.0000 | 1.618000 | 63.3897 | 11.47 |
| 11 | 80.1868 | D11 | | | 11.07 |
| 12-Stop | Infinity | 0.5234 | | | 5.04 |
| 13 | −57.4895 | 2.0000 | 1.658440 | 50.8829 | 5.07 |
| 14 | −22.2581 | 0.1000 | | | 5.22 |
| 15 | 21.2895 | 2.5000 | 1.438750 | 94.9460 | 5.22 |
| 16 | −22.6132 | 1.7000 | 1.637750 | 42.4102 | 5.12 |
| 17 | 92.8700 | D17 | | | 5.02 |
| 18 | −26.1604 | 1.8000 | 1.618000 | 63.3897 | 4.74 |
| 19 | −18.0000 | 1.5000 | 1.651600 | 58.5178 | 4.80 |
| 20 | −158.0819 | 10.7000 | | | 4.90 |
| 21 | −405.0225 | 2.0000 | 1.691002 | 54.7084 | 5.51 |
| 22 | −30.2332 | 40.0203 | | | 5.57 |
| 23 | Infinity | | | | 3.10 |

| Variable data | | | |
|---|---|---|---|
| | Wide angle end (Z1) | Intermediate (Z4) | Telephoto end (Z7) |
| Focal length | 20 | 63.25 | 200 |
| F/# | 5.11 | 5.84 | 7.00 |
| Half field of view | 9.36° | 2.85° | 0.89° |
| D5 | 5.0000 | 92.3481 | 146.0000 |
| D11 | 164.7078 | 70.2225 | 5.1558 |
| D17 | 5.5637 | 12.7009 | 24.1158 |

It's preferred to use the doublet in the fourth lens group (Surfaces 18 to 20) in Embodiment 4 as the vibration compensation group to move in a direction perpendicular to the optical axis for image stabilization. Other groups or subgroups of the zoom lens system, such as the last lens element in the second lens group, could also be used as the vibration compensation group.

Embodiment 5

Figure 18:
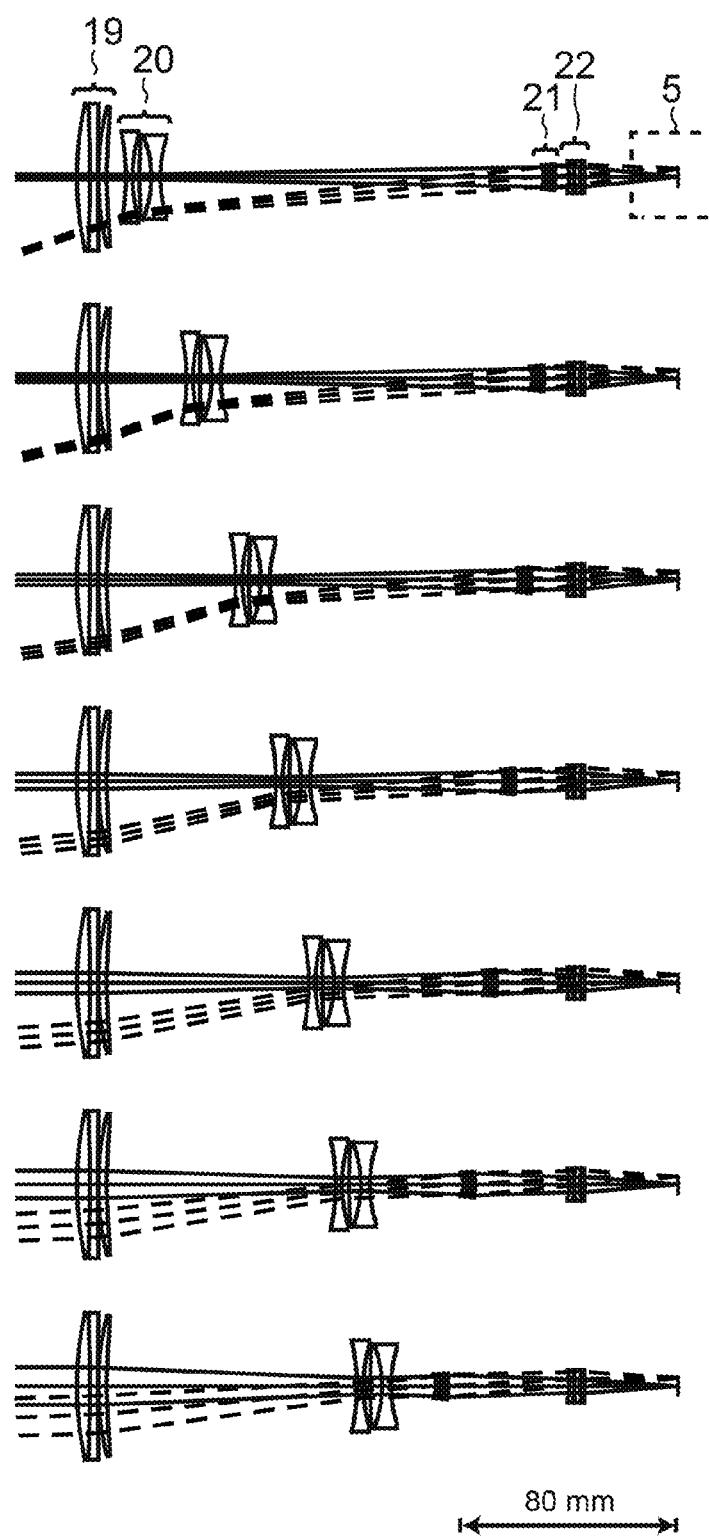
FIG. 18-21 are for Embodiment 5 of a design with EFL of 10 mm to 100 mm and spectrum of 400 nm to 900 nm.

FIG. 18 presents Embodiment 5, which covers the spectral range of 400 nm to 900 nm, from visible to near-infrared. The system effective focal lengths at the seven representative zoom positions (Z1-Z7) are, in order from the wide-angle end above to the telephoto end below, EFL=10 mm, 14.68 mm, 21.54 mm, 31.62 mm, 46.42 mm, 68.13 mm, 100 mm, in a geometric sequence.

All optical surfaces in Embodiment 5 are spherical surfaces, including flat surfaces with radius of infinity. The overall length of Embodiment 5 from Surface 1 (Table 5) to the image plane is 229 mm. From the object side to the image side, Surfaces 1 to 5 constitute the first lens group 19 (G1); Surfaces 6 to 10 constitute the second lens group 20 (G2); Surface 11 is the aperture stop; Surfaces 12 to 17 constitute the third lens group 21 (G3); Surfaces 18 to 22 constitute the fourth lens group 22 (G4). A detection system 5 follows the zoom lens groups, and it is sensitive to the visible to near-infrared spectral range of 400 nm to 900 nm. The detection system contains the image plane Surface 23 in Embodiment 5. The aperture stop maintains a fixed diameter through zoom, and it's located at a fixed distance to G3, and moves along with G3 during the zoom motion.

Figure 19:
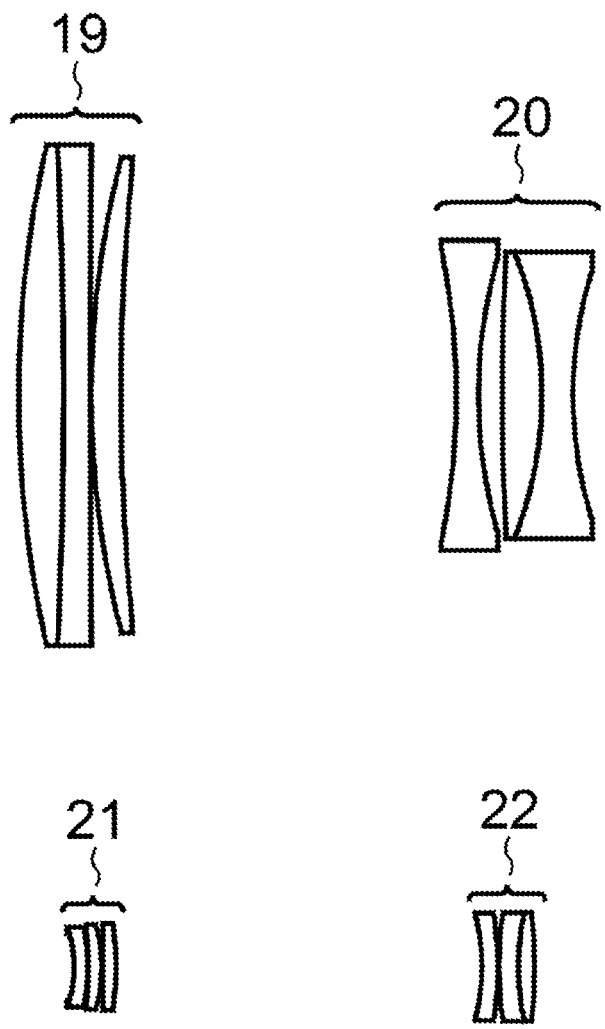

FIG. 19 presents the detailed lens shapes of each lens group of Embodiment 5.

Figure 20:
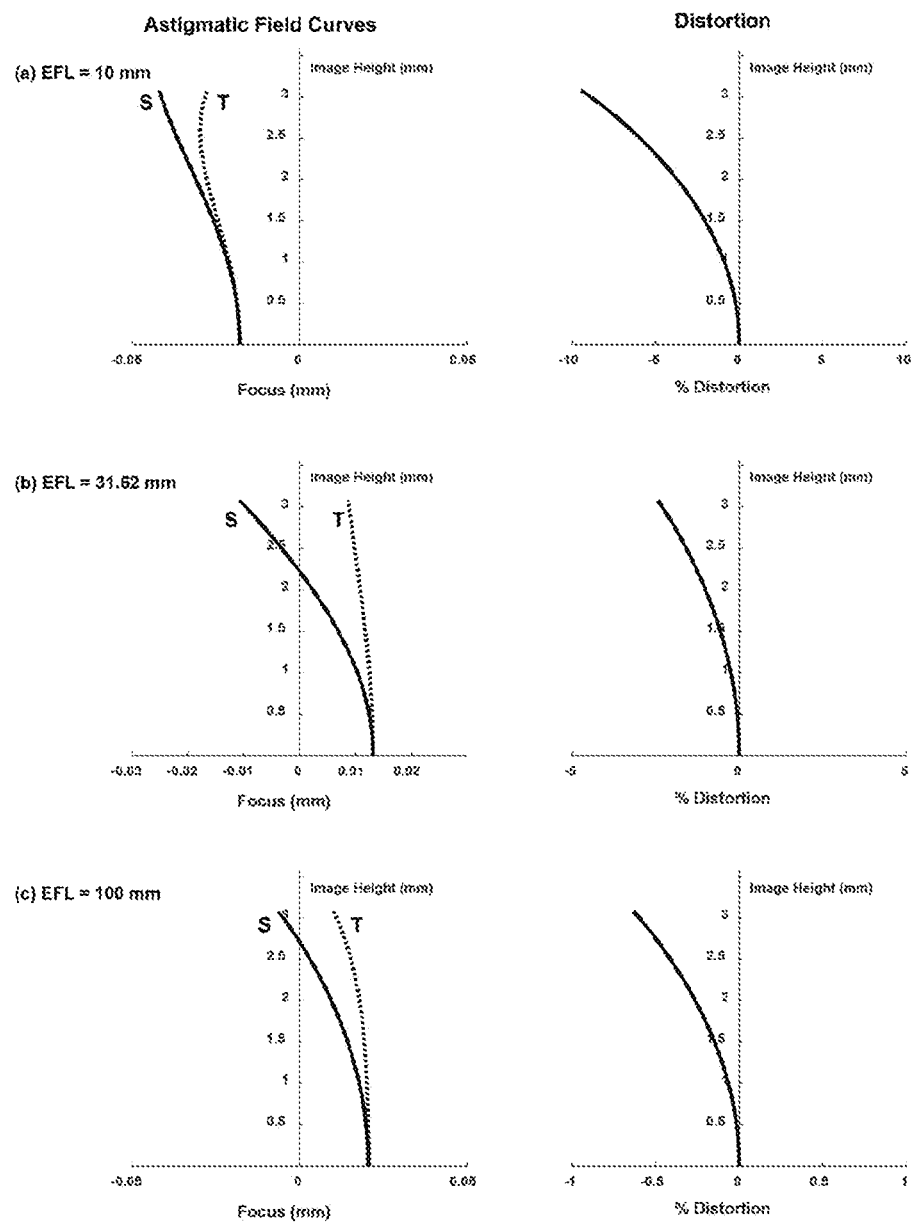

FIG. 20 (a)-(c) present Embodiment 5 astigmatic field curves on the left and distortion on the right at Z1, Z4, and Z7.

Figure 21:
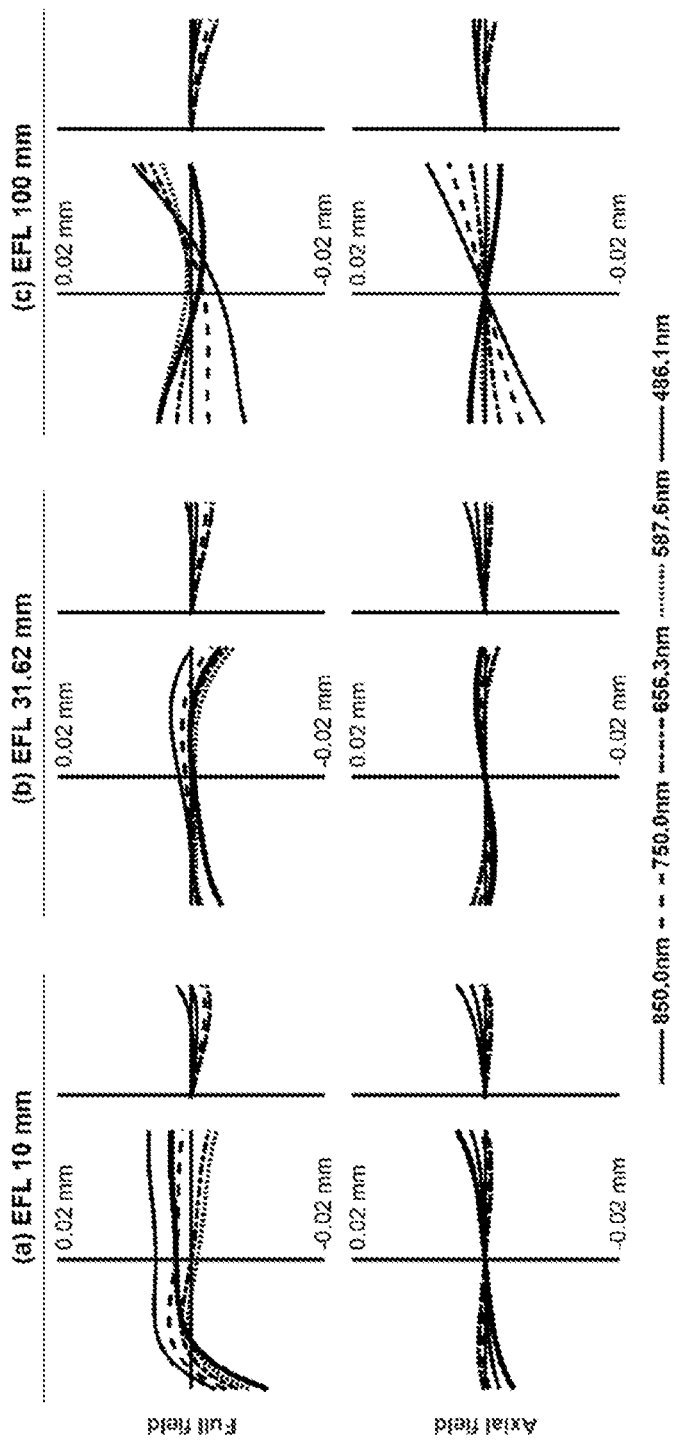

FIG. 21 presents the transverse ray aberration plots of Embodiment 5 at Z1, Z4, and Z7. For each zoom position, the tangential ray fan is on the left and the sagittal ray fan is on the right.

The numerical details of Embodiment 5 are listed in Table 5, and the length values are in units of mm. The variable data listed are at three representative zoom positions: Z1, Z4, and Z7.

TABLE 5

| Surface Number | Radius of curvature | Thickness | $n_d$ | $V_d$ | Semi-Aperture |
|---|---|---|---|---|---|
| 1 | 125.8163 | 5.0000 | 1.438750 | 94.9460 | 24.94 |
| 2 | −574.2266 | 3.0000 | 1.922860 | 20.8797 | 24.68 |
| 3 | 2501.4931 | 0.1000 | | | 24.37 |
| 4 | 104.1360 | 3.3306 | 1.589130 | 61.1498 | 23.93 |
| 5 | 253.5065 | D5 | | | 23.62 |
| 6 | −80.1538 | 2.5000 | 1.607381 | 56.6501 | 16.03 |
| 7 | 55.2239 | 2.6362 | | | 14.87 |
| 8 | 269.7918 | 4.4445 | 1.784720 | 25.6800 | 14.73 |
| 9 | −43.0780 | 3.5000 | 1.607381 | 56.6501 | 14.58 |
| 10 | 46.6832 | D10 | | | 13.36 |
| 11-Stop | Infinity | 0.8425 | | | 3.71 |
| 12 | −13.1490 | 1.5000 | 1.637750 | 42.4102 | 3.74 |
| 13 | −22.7302 | 0.1000 | | | 4.04 |
| 14 | −46.3811 | 1.5000 | 1.438750 | 94.9460 | 4.09 |
| 15 | −16.1174 | 0.1000 | | | 4.26 |
| 16 | 264.3678 | 1.5000 | 1.438750 | 94.9460 | 4.33 |
| 17 | −30.9507 | D17 | | | 4.40 |
| 18 | −22.4453 | 1.8000 | 1.637750 | 42.4102 | 5.23 |
| 19 | −34.4453 | 0.1000 | | | 5.43 |
| 20 | 40.7319 | 2.2000 | 1.805180 | 25.3597 | 5.50 |
| 21 | 28.7319 | 1.7819 | 1.620141 | 63.4804 | 5.44 |
| 22 | −56.6882 | 35.5000 | | | 5.44 |
| 23 | Infinity | | | | 3.09 |

TABLE 5-continued

| | Variable data | | |
|---|---|---|---|
| | Wide angle end (Z1) | Intermediate (Z4) | Telephoto end (Z7) |
| Focal length | 10 | 31.62 | 100 |
| F/# | 4.80 | 5.63 | 7.00 |
| Half field of view | 18.81° | 5.71° | 1.78° |
| D5 | 7.2931 | 64.4217 | 95.2106 |
| D10 | 145.1224 | 72.6853 | 16.2636 |
| D17 | 5.1488 | 20.4574 | 46.0901 |

It's preferred to use the fourth lens group in Embodiment 5 as the vibration compensation group to move in a direction perpendicular to the optical axis for image stabilization. Other groups or subgroups of the zoom lens system could also be used as the vibration compensation group.

Embodiment 6

Figure 22:
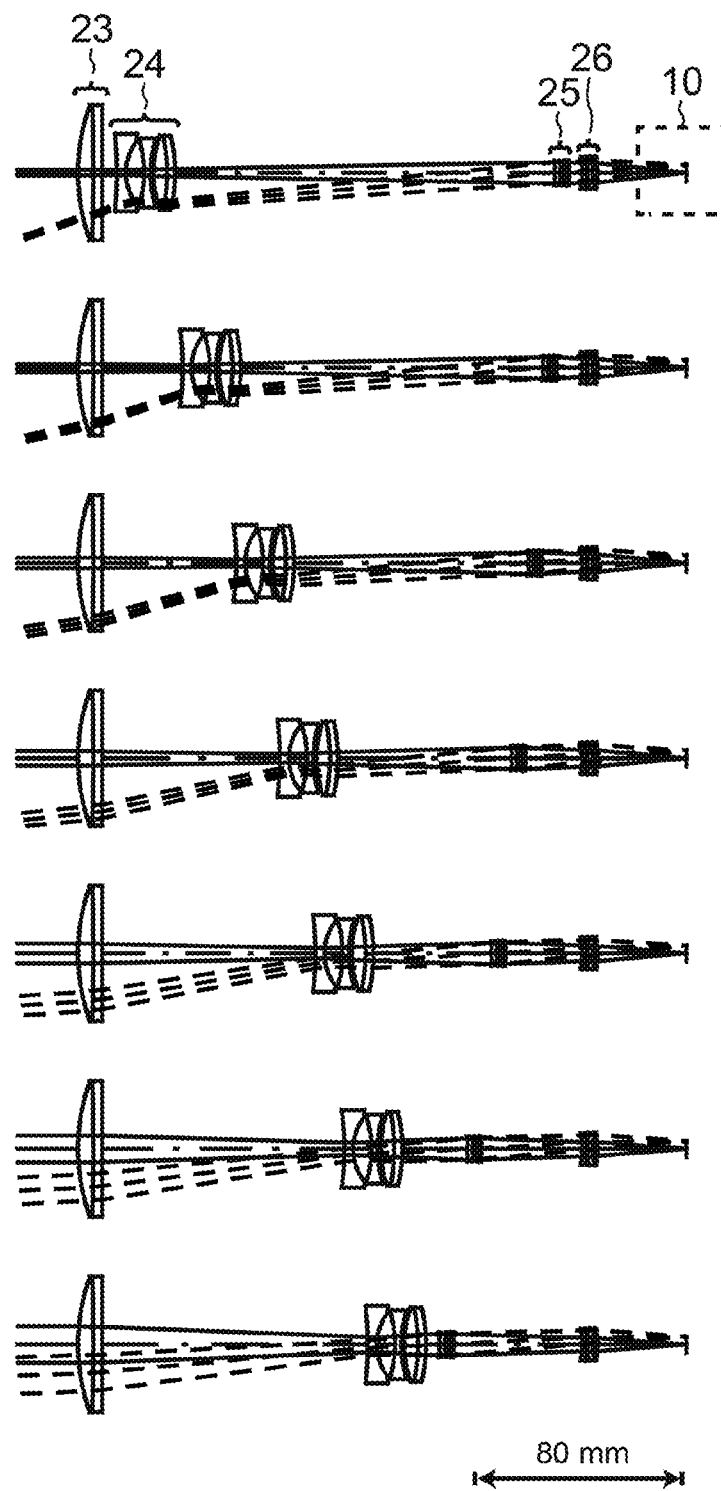
FIG. 22-25 are for Embodiment 6 of a design with EFL of 10 mm to 100 mm and spectrum of 400 nm to 1700 nm.

FIG. 22 presents Embodiment 6, which covers the spectral range of 400 nm to 1700 nm, from visible to short-wave infrared. The system effective focal lengths at the seven representative zoom positions (Z1-Z7) are, in order from the wide-angle end above to the telephoto end below, EFL=10 mm, 14.68 mm, 21.54 mm, 31.62 mm, 46.42 mm, 68.13 mm, 100 mm, in a geometric sequence.

The front surface in Embodiment 6 is an aspherical surface, and the rest optical surfaces are all spherical surfaces, including flat surfaces with radius of infinity. The overall length of Embodiment 6 from Surface 1 (Table 6) to the image plane is 239 mm. From the object side to the image side, Surfaces 1 to 3 constitute the first lens group 23 (G1); Surfaces 4 to 10 constitute the second lens group 24 (G2); Surface 11 is the aperture stop; Surfaces 12 to 16 constitute the third lens group 25 (G3); Surfaces 17 to 21 comprise constitute the fourth lens group 26 (G4). A detection system 10 follows the zoom lens groups, and it is sensitive to the visible to short wave-infrared spectral range of 400 nm to 1700 nm. The detection system contains the image plane Surface 22 in Embodiment 6. The aperture stop maintains a fixed diameter through zoom, and it's located at a fixed distance to G3, and moves along with G3 during zoom.

Figure 23:
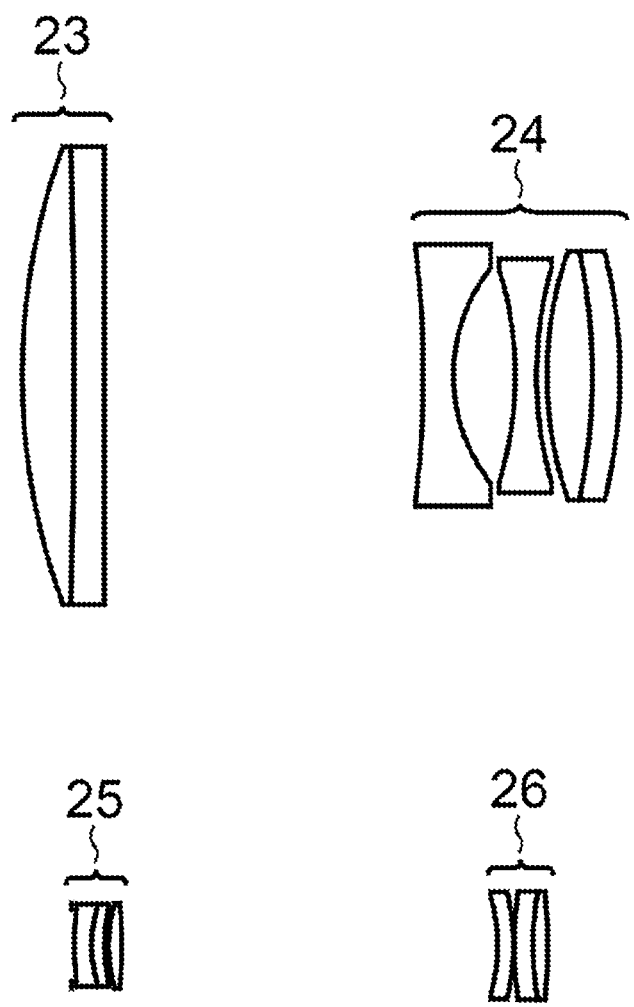

FIG. 23 presents the detailed lens shapes of each lens group of Embodiment 6.

Figure 24:
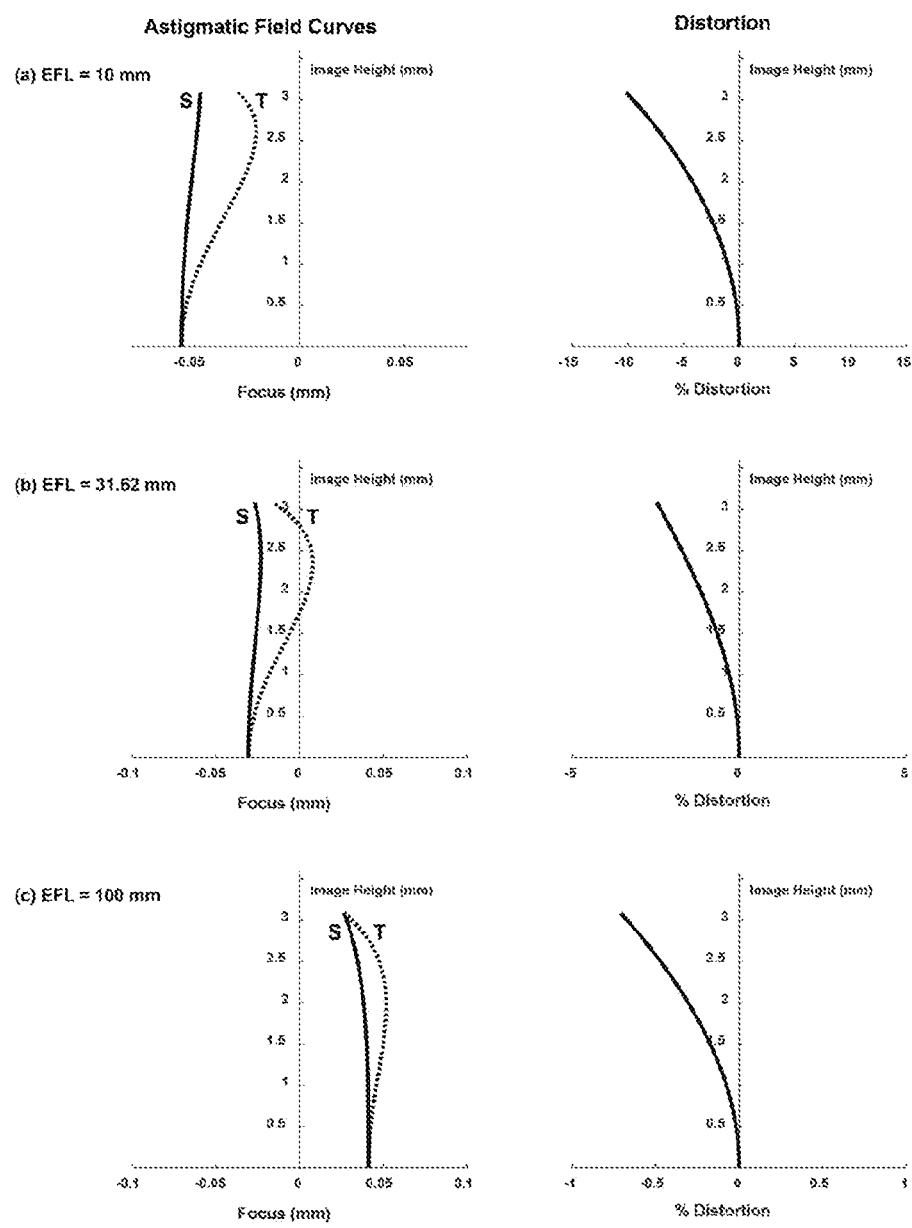

FIG. 24 (a)-(c) present Embodiment 6 astigmatic field curves on the left and distortion on the right at Z1, Z4, and Z7.

Figure 25:
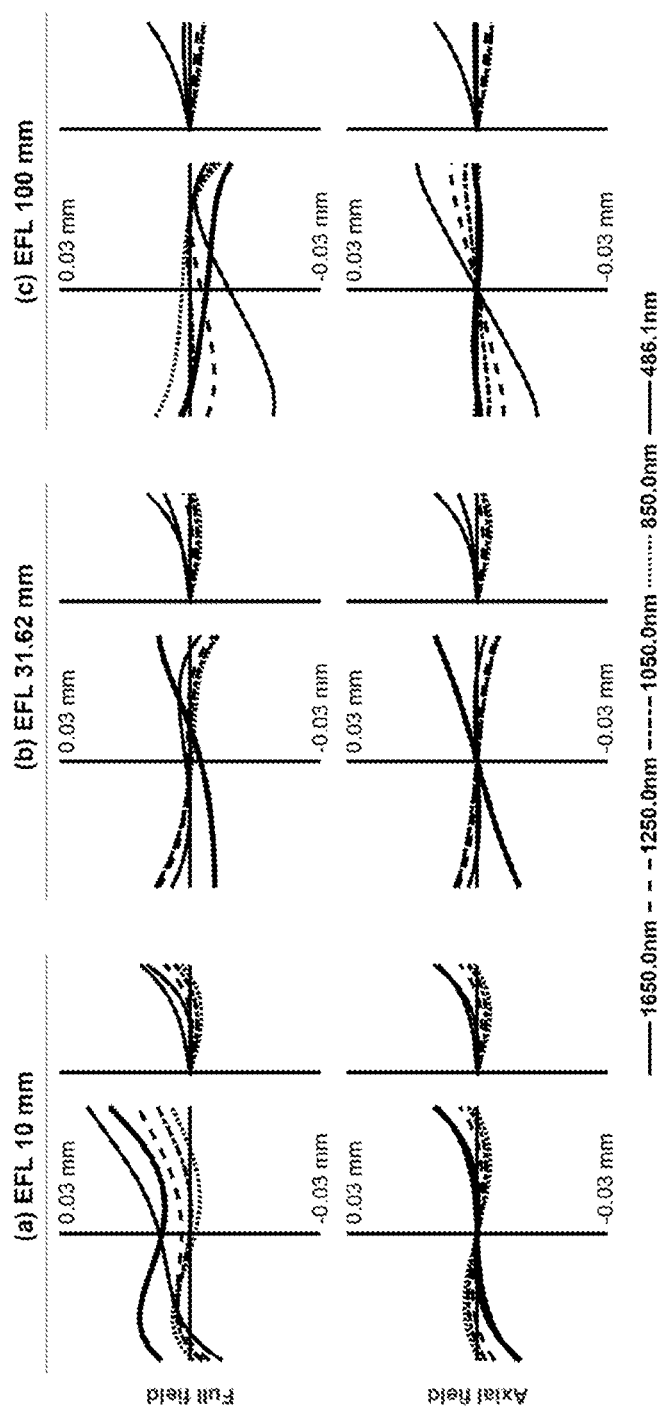

FIG. 25 presents the transverse ray aberration plots of Embodiment 6 at Z1, Z4, and Z7. For each zoom position, the tangential ray fan is on the left and the sagittal ray fan is on the right.

The numerical details of Embodiment 6 are listed in Table 6, and the length values are in units of mm. The variable data listed are at three representative zoom positions: Z1, Z4, and Z7.

TABLE 6

| Surface Number | Radius of curvature | Thickness | $n_d$ | $V_d$ | Semi-Aperture |
|---|---|---|---|---|---|
| 1* | 75.4406 | 6.0091 | 1.438750 | 94.9460 | 24.19 |
| 2 | −918.5429 | 3.5000 | 1.922860 | 20.8797 | 23.89 |
| 3 | Infinity | D3 | | | 23.43 |
| 4 | −115.2581 | 3.5000 | 1.486561 | 84.4680 | 13.96 |
| 5 | 20.0000 | 7.1588 | | | 11.91 |
| 6 | −41.6110 | 2.5000 | 1.652240 | 44.9594 | 11.86 |
| 7 | 45.6635 | 1.2000 | | | 12.43 |
| 8 | 42.9738 | 5.2701 | 1.749502 | 34.9506 | 12.99 |

TABLE 6-continued

| | | | | |
|---|---|---|---|---|
| 9 | −68.8446 | 3.2000 | 1.607381 | 56.6501 | 13.11 |
| 10 | −58.8446 | D10 | | | 13.25 |
| 11-Stop | Infinity | 0.3000 | | | 4.12 |
| 12 | 38.8276 | 2.0000 | 1.637750 | 42.4102 | 4.17 |
| 13 | 15.1745 | 1.5000 | 1.43875 | 94.946 | 4.22 |
| 14 | 21.5864 | 0.5000 | | | 4.30 |
| 15 | 18.5244 | 1.5000 | 1.43875 | 94.9460 | 4.41 |
| 16 | −51.4920 | D16 | | | 4.44 |
| 17 | −19.6756 | 1.8000 | 1.63775 | 42.4102 | 5.38 |
| 18 | −26.6756 | 0.1000 | | | 5.61 |
| 19 | 40.3992 | 2.2000 | 1.80518 | 25.3597 | 5.68 |
| 20 | 33.3992 | 1.7078 | 1.620141 | 63.4804 | 5.62 |
| 21 | −67.8275 | 35.0486 | | | 5.60 |
| 22 | Infinity | | | | 3.09 |

Aspherical surface data

Surface number

| | | | | | | |
|---|---|---|---|---|---|---|
| 1* | k = 0 | A = −1.24403 × $10^{-7}$ | B = 6.23925 × $10^{-12}$ | C = 1.66496 × $10^{-14}$ | D = 0 | E = 0 |

Variable data

| | Wide angle end (Z1) | Intermediate (Z4) | Telephoto end (Z7) |
|---|---|---|---|
| Focal length | 10 | 31.62 | 100 |
| F/# | 4.68 | 5.56 | 7.00 |
| Half field of view | 18.93° | 5.71° | 1.78° |
| D3 | 5.8481 | 69.8006 | 104.3619 |
| D10 | 148.8061 | 67.8456 | 5.0000 |
| D16 | 5.3515 | 22.3594 | 50.6437 |

It's preferred to use the fourth lens group in Embodiment 6 as the vibration compensation group to move in a direction perpendicular to the optical axis for image stabilization. Other groups or subgroups of the zoom lens system could also be used as the vibration compensation group.

Based on the six disclosed embodiments, a summary table of the system spectrum, the overall length, critical focal length relations and the relative partial dispersion ratio of each embodiment are listed in Table 7. The designs with a spectral range of 400 nm-900 nm are evaluated at a reference wavelength of 656.3 nm, and the designs with a spectral range of 400 nm-1700 nm are evaluated at a reference wavelength of 1050 nm. Also, in Table 7, the relative partial dispersion ratio is $P_k$, where the subscript k=1 for 400 nm-900 nm designs, and k=2 for 400 nm-1700 nm designs.

Note that although the aperture stop maintains a fixed diameter through zoom in the six disclosed embodiments, the aperture stop diameter could also be varied during zoom. Further, the distance from the aperture stop to G3 could also be varied during zoom.

Moreover, although the disclosed embodiments are all based on refractive lens groups, those skilled in the art could readily extend these embodiments to designs of all reflective mirror groups, or a catadioptric optical system.

Figure 26:
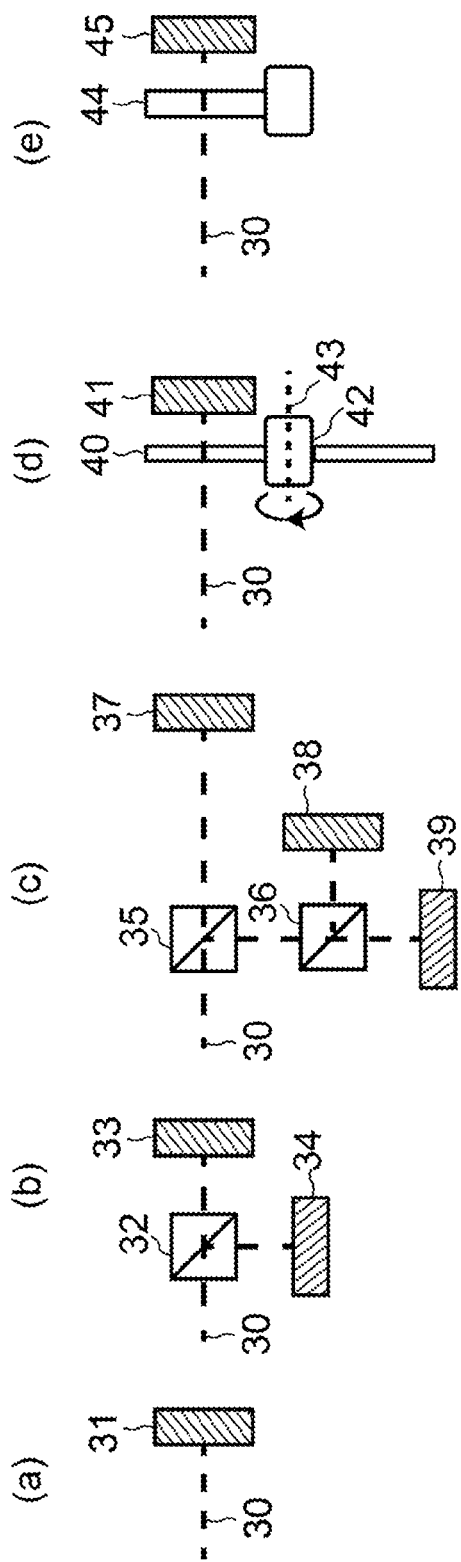
FIG. 26 presents five representative embodiments of the detection system.

The detection system 5 or 10 are similar except that the detection system 10 covers a broader spectral range (visible to short wave-infrared) than the detection system 5 (visible to near infrared). FIG. 26 presents five embodiments of the detection system 5 or 10. FIG. 26(a) shows one embodiment of a single multispectral detector 31, with respect to an

TABLE 7

| | Embodiment 1 | Embodiment 2 | Embodiment 3 | Embodiment 4 | Embodiment 5 | Embodiment 6 |
|---|---|---|---|---|---|---|
| Spectral range (nm) | 400-900 | 400-1700 | 400-900 | 400-1700 | 400-900 | 400-1700 |
| Reference wavelength (nm) | 656.3 | 1050 | 656.3 | 1050 | 656.3 | 1050 |
| f1 (mm) | 308.77 | 298.75 | 314.93 | 320.23 | 178.44 | 189.85 |
| f2 (mm) | −50.73 | −49.41 | −56.72 | −55.93 | −38.89 | −43.31 |
| f3 (mm) | 54.18 | 53.17 | 47.22 | 40.34 | 58.03 | 64.46 |
| f4 (mm) | 241.46 | 313.21 | 99.44 | 162.77 | 64.08 | 60.91 |
| $f_W$ (mm) | 30 | 30 | 20 | 20 | 10 | 10 |
| $f_T$ (mm) | 300 | 300 | 200 | 200 | 100 | 100 |
| $(f_W \cdot f_T)^{1/2}$ (mm) | 94.87 | 94.87 | 63.25 | 63.25 | 31.62 | 31.62 |
| $|f2|/(f_W \cdot f_T)^{1/2}$ | 0.53 | 0.52 | 0.90 | 0.88 | 1.23 | 1.37 |
| f4/|f2| | 4.76 | 6.34 | 1.75 | 2.91 | 1.65 | 1.41 |
| |f2|/f3 | 0.94 | 0.93 | 1.20 | 1.39 | 0.67 | 0.67 |
| Overall Length (mm) | 308 | 310 | 280 | 281.22 | 229 | 239 |
| Back focal length (mm) | 48.41 | 54.60 | 40.00 | 40.02 | 35.50 | 35.05 |
| $P_k(G2p)_{AVE}$ | 0.7679 | 0.7971 | 0.7831 | 0.8353 | 0.8018 | 0.8175 |
| $P_k(G2n)_{AVE}$ | 0.7548 | 0.7812 | 0.7710 | 0.8099 | 0.7624 | 0.8022 |
| $P_k(G2p)_{AVE} - P_k(G2n)_{AVE}$ | 0.0132 | 0.0159 | 0.0121 | 0.0254 | 0.0394 | 0.0153 | optical axis 30 of the preceding zoom lens groups. 31 has pixels covering both visible and infrared spectra. The spectral splitting in 31 is achieved by narrow band spectral filters matched to each pixel. For example, the detector 31 could have four different types of pixels: red (R), green (G), blue (B) and near infrared (NIR) pixels. In FIG. 26(b), the detection system comprises a dichroic beamsplitter 32, and two different detectors 33 and 34. The dichroic beamsplitter 32 functions as a spectral splitting unit, and splits the light into one visible branch and one infrared branch. In one embodiment, the detector 33 is sensitive to the visible branch, which could be a regular RGB three-color channel camera, and the other detector 34 is sensitive to the infrared branch. In FIG. 26(c), the detection system comprises a first dichroic beamsplitter 35, which splits light into a visible and near infrared (VNIR) branch and a short-wave infrared (SWIR) branch. A detector 37 is responsive to the SWIR branch. A second dichroic beamsplitter 36 further splits the VNIR branch into a visible branch and a near infrared (NIR) branch, and a visible detector 38 and a near infrared detector 39 are used to match the two branches. The beamsplitters 35 and 36 together in FIG. 26(c) function as a spectral splitting unit. The embodiment of the beamsplitter in FIG. 26(b) and FIG. 26(c) could be a cube beamsplitter, a plate beamsplitter, a pellicle beamsplitter, etc.

In FIG. 26(d), the detection system comprises a rotating spectral filter wheel 40 as a spectral splitting unit, which has different narrow band spectral filters embedded inside. A motor 42 rotates around an axis 43, and the narrow band spectral filters in front of a detector 41 change in a cyclic order. The detector 41 is sensitive to a broad range of spectrum including visible and infrared. In one embodiment, the alternating narrow band spectral filters in the filter wheel 40 are of R, G, B, NIR four types.

In FIG. 26(e), a tunable filter 44 to select different wavelengths to pass is placed in front of a detector 45 in a hyperspectral setup, and the tunable filter 44 is a spectral splitting unit. The embodiment of the tunable filter could be an acousto-optic tunable filter, or a liquid crystal tunable filter, etc.

The detection systems in FIG. 26(d) and FIG. 26(e) form images of two-dimensional object at a narrow spectral range at any moment, and the wavelength is sequentially adjusted to cover a broad spectral range, including the visible and infrared spectra, to generate multispectral or hyperspectral image series of the object.

Figure 27:
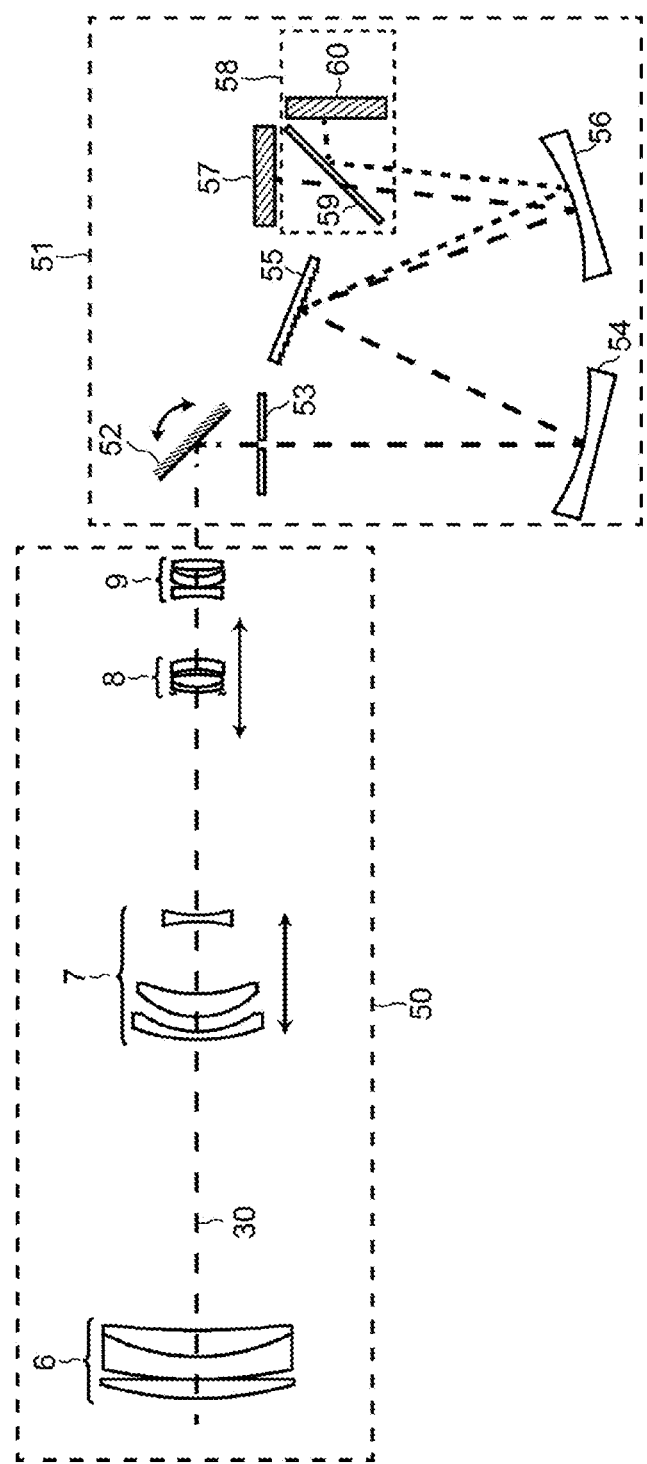
FIG. 27 presents a hyperspectral system combining the zoom lens groups with a reflective spectrometer.

FIG. 27 presents a hyperspectral system combining the disclosed zoom lens groups with a spectrometer system. The detection system comprises a spectrometer system. The zoom lens 50 with an optical axis 30 is used for imaging, and in FIG. 27, Embodiment 2 with lens groups of 6, 7, 8, and 9 are used for illustrative purposes. The second and third lens groups 7 and 8 are movable during zoom. A detection system 51 follows the zoom lens 50, and it is a spectrometer system. 51 comprises a scanning mirror 52, which guides light toward a slit 53. In a preferred embodiment, the slit is located at the image plane of the preceding zoom lens 50. Through the slit 53, only one slice of spatial dimension from the object is retained to avoid mixing the spectral information from different spatial slices. With the movement of the scanning mirror 52, different spatial slices could be scanned and the image of the entire object could be obtained during scanning. After the slit 53, light gets reflected off a collimating mirror 54. Collimated light off 54 is dispersed into different wavelengths by a grating 55, which functions as the spectral splitting unit in the spectrometer system. The dispersed light is reflected off a focusing mirror 56 and reaches a detector 57. 57 is sensitive to a broadband spectrum range. In one embodiment, 57 is a single detector that is sensitive to the visible and infrared spectral range. In some other embodiments, an optional optical detector unit 58 could be used, which comprises a dichroic beamsplitter 59, and a detector 60. 59 is used to split light into a VNIR branch and a SWIR branch. 57 could be a VNIR detector to match the VNIR branch, and 60 could be a SWIR detector to match the SWIR branch.

FIG. 27 presents the spectrometer system as a Czerny-Turner spectrometer, but other spectrometer configurations such as a Littrow spectrometer, an Ebert-Fastie spectrometer, etc could also be employed. Further, the grating in FIG. 27 could be ruled on a concave or convex surface, hence an Eagle spectrometer, a Wadsworth spectrometer, a Dyson spectrometer, or other similar configurations could also be used.

Figure 28:
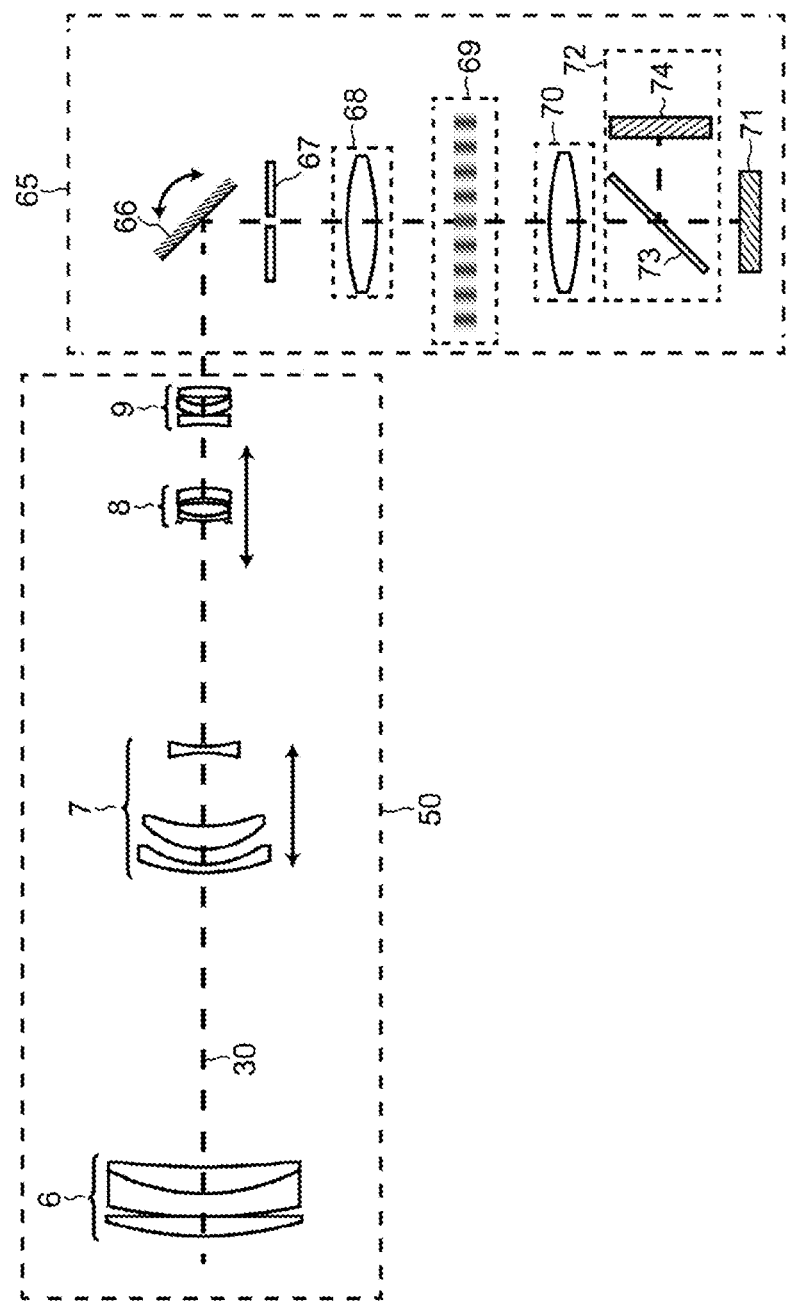
FIG. 28 presents a hyperspectral system combining the zoom lens groups with a transmissive spectrometer.

The spectrometer system could also be a transmissive spectrometer 65 as shown in FIG. 28. The transmissive spectrometer 65 comprises a scanning mirror 66, a slit 67, a collimating lens group 68, a transmissive dispersive element 69, a focusing lens group 70, and a detector 71. Preferably, the slit 67 is located at the image plane of the preceding zoom lens 50. Collimated light after 68 is dispersed into different wavelengths by the transmissive dispersive element 69, and the embodiment of 69 could be a volume phase holographic (VPH) transmission grating, a diffractive lens, a prism, a Bragg grating, or other similar dispersive elements. Light after 69 is collected by the focusing lens group 70 and reaches the detector 71. In some embodiments, an optional optical detector unit 72 could be used, which comprises a dichroic beamsplitter 73, and a detector 74. 73 is used to split light into a VNIR branch and a SWIR branch. 71 could be a VNIR detector to match the VNIR branch, and 74 could be a SWIR detector to match the SWIR branch.

Moreover, the spectrometer system could also be a Fourier transform spectrometer, where the object spectrum is retrieved from the Fourier transform of interferograms. One embodiment of the Fourier transform spectrometer is based on a Michaelson interferometer, which comprises a moving mirror and a stationary mirror. The optical path difference (OPD) and the resultant interferogram vary with the displacement of the moving mirror.

The preferred embodiments of the zoom lens groups and detection systems listed above are optimized for the visible and infrared spectra. However, those skilled in the art could readily extend the spectral range to cover ultraviolet (UV) as well.

While this invention has been described with reference to exemplary embodiments, it is to be understood that the invention is not limited to the disclosed embodiments. Modification and variation of this invention may be made without departing from the scope of the following claims.

All publications, patents and patent applications referred to herein are incorporated by reference in their entirety to the same extent as if each individual publication, patent or patent application was specifically and individually indicated to be incorporated by reference in its entirety in the present application.

What is claimed is:

1. A zoom lens system comprising, in order from an object side to an image side:
   a first lens group having positive power;
   a second lens group having negative power;
   a third lens group having positive power;
   a fourth lens group having positive power; and
   a detection system;

wherein the four lens groups and said detection system operate in a broad spectral range, covering visible and infrared spectra;

wherein each of the four lens groups comprises at least one lens element;

wherein zooming from a wide-angle end position to a telephoto end position is performed by moving said second and third lens groups along an optical axis, such that the distance between said first and second lens groups increases and the distance between said second and third lens groups decreases;

wherein the zoom lens system satisfies the following conditions:

$$0.2<|f2|/(f_W \cdot f_T)^{1/2}<2, 1<|f4|/|f2|<8, 0.3<|f2|/f3<1.5,$$

where $f_W$ is a system focal length at the wide-angle end position, $f_T$ is a system focal length at the telephoto end position, $(f_W \cdot f_T)^{1/2}$ is a geometric mean of the system focal lengths at the wide-angle end position and the telephoto end position, and fi is a focal length of the i-th lens group;

wherein a refractive index of a lens material at 400 nm is represented as $n_{s1}$, a refractive index of the lens material at 650 nm is represented as $n_{m1}$, a refractive index of the lens material at 900 nm is represented as $n_{l1}$ and a first relative partial dispersion ratio $P_1=(n_{s1}-n_{m1})/(n_{s1}-n_{l1})$, and a condition of $-0.010<P_1(G2p)_{AVE}-P_1(G2n)_{AVE}<0.045$ is satisfied, where $P_1(G2p)_{AVE}$ is an average value of the first relative partial dispersion ratios of lens materials of all the positive lens elements in said second lens group, and $P_1(G2n)_{AVE}$ is an average value of the first relative partial dispersion ratios of lens materials of all the negative lens elements in said second lens group.

2. The zoom lens system of claim 1, wherein said detection system comprises a spectral splitting unit.

3. The zoom lens system of claim 2, wherein said spectral splitting unit in said detection system comprises at least one dichroic beamsplitter.

4. The zoom lens system of claim 2, wherein said spectral splitting unit in said detection system comprises a rotating spectral filter wheel with alternating narrow band spectral filters.

5. The zoom lens system of claim 2, wherein said spectral splitting unit in said detection system comprises a tunable filter, wherein said tunable filter is an acousto-optic tunable filter or a liquid crystal tunable filter.

6. The zoom lens system of claim 1, wherein said detection system comprises a spectrometer system.

7. The zoom lens system of claim 6, wherein said spectrometer system comprises a member selected from a group consisting of a Czerny-Turner spectrometer, a Littrow spectrometer, an Ebert-Fastie spectrometer, an Eagle spectrometer, a Wadsworth spectrometer, a Dyson spectrometer, a transmissive spectrometer, and a Fourier transform spectrometer.

8. The zoom lens system of claim 1, wherein said fourth lens group or a last lens element of said fourth lens group is axially displaceable, wherein a displacement is adjusted to focus on objects closer to the zoom lens system.

9. The zoom lens system of claim 1, wherein at least a portion of said third lens group or at least a portion of said fourth lens group is moved in a direction perpendicular to said optical axis for image stabilization.

10. A zoom lens system comprising, in order from an object side to an image side:

a first lens group having positive power;
a second lens group having negative power;
a third lens group having positive power;
a fourth lens group having positive power; and
a detection system;

wherein the four lens groups and said detection system operate in a broad spectral range, covering visible and infrared spectra;

wherein each of the four lens groups comprises at least one lens element;

wherein zooming from a wide-angle end position to a telephoto end position is performed by moving said second and third lens groups along an optical axis, such that the distance between said first and second lens groups increases and the distance between said second and third lens groups decreases;

wherein the zoom lens system satisfies the following conditions:

$$0.2<|f2|/(f_W \cdot f_T)^{1/2}, 1<|f4|/|f2|<8, 0.3<|f2|/f3<1.5,$$

where $f_W$ is a system focal length at the wide-angle end position, $f_T$ is a system focal length at the telephoto end position, $(f_W \cdot f_T)^{1/2}$ is a geometric mean of the system focal lengths at the wide-angle end position and the telephoto end position, and fi is a focal length of the i-th lens group;

wherein a refractive index of a lens material at 400 nm is represented as $n_{s2}$, a refractive index of the lens material at 1050 nm is represented as $n_{m2}$, a refractive index of the lens material at 1700 nm is represented as $n_{l2}$, and a second relative partial dispersion ratio $P_2=(n_{s2}-n_{m2})/(n_{s2}-n_{l2})$, and a condition of $-0.010<P_2(G2p)_{AVE}-P_2(G2n)_{AVE}<0.035$ is satisfied, where $P_2(G2p)_{AVE}$ is an average value of the second relative partial dispersion ratios of lens materials of all the positive lens elements in said second lens group, and $P_2(G2n)_{AVE}$ is an average value of the second relative partial dispersion ratios of lens materials of all the negative lens elements in said second lens group.

11. The zoom lens system of claim 10, wherein said detection system comprises a spectral splitting unit.

12. The zoom lens system of claim 11, wherein said spectral splitting unit in said detection system comprises at least one dichroic beamsplitter.

13. The zoom lens system of claim 11, wherein said spectral splitting unit in said detection system comprises a rotating spectral filter wheel with alternating narrow band spectral filters.

14. The zoom lens system of claim 11, wherein said spectral splitting unit in said detection system comprises a tunable filter, wherein said tunable filter is an acousto-optic tunable filter or a liquid crystal tunable filter.

15. The zoom lens system of claim 10, wherein said detection system comprises a spectrometer system.

16. The zoom lens system of claim 15, wherein said spectrometer system comprises a member selected from a group consisting of a Czerny-Turner spectrometer, a Littrow spectrometer, an Ebert-Fastie spectrometer, an Eagle spectrometer, a Wadsworth spectrometer, a Dyson spectrometer, a transmissive spectrometer, and a Fourier transform spectrometer.

17. The zoom lens system of claim 10, wherein said fourth lens group or a last lens element of said fourth lens group is axially displaceable, wherein a displacement is adjusted to focus on objects closer to the zoom lens system.

18. The zoom lens system of claim 10, wherein at least a portion of said third lens group or at least a portion of said fourth lens group is moved in a direction perpendicular to said optical axis for image stabilization.

\* \* \* \* \*